(12) United States Patent
Kim et al.

(10) Patent No.: US 12,147,619 B2
(45) Date of Patent: Nov. 19, 2024

(54) METHOD OF EVALUATING MAGNETO-RHEOLOGICAL ROTATING LOAD DEVICE

(71) Applicant: CK MATERIALS LAB CO., LTD., Ansan-si (KR)

(72) Inventors: Hyeong Jun Kim, Seoul (KR); Jeen Gi Kim, Seoul (KR); Min Jae Kang, Seoul (KR); Dong Wook Kim, Seoul (KR)

(73) Assignee: CK MATERIALS LAB CO., LTD., Ansan-si (KR)

( * ) Notice: Subject to any disclaimer, the term of this patent is extended or adjusted under 35 U.S.C. 154(b) by 0 days.

(21) Appl. No.: 18/172,736

(22) Filed: Feb. 22, 2023

(65) Prior Publication Data
US 2023/0393677 A1    Dec. 7, 2023

(30) Foreign Application Priority Data

Jun. 7, 2022 (KR) .......................... 10-2022-0068842

(51) Int. Cl.
| | | |
|---|---|---|
| *G06F 3/0362* | (2013.01) | |
| *G01L 5/00* | (2006.01) | |
| *G01L 25/00* | (2006.01) | |
| *G06F 3/01* | (2006.01) | |
| *G01L 3/02* | (2006.01) | |
| *G01M 99/00* | (2011.01) | |
| *H01H 19/14* | (2006.01) | |

(52) U.S. Cl.
CPC .......... *G06F 3/0362* (2013.01); *G01L 5/0042* (2013.01); *G01L 25/003* (2013.01); *G06F 3/016* (2013.01); *G01L 3/02* (2013.01); *G01M 99/007* (2013.01); *G01M 99/008* (2013.01); *H01H 19/14* (2013.01)

(58) Field of Classification Search
CPC ....... G06F 3/016; G06F 3/0362; G01L 5/0042
USPC ....................................................... 345/184
See application file for complete search history.

(56) References Cited

U.S. PATENT DOCUMENTS

| | | | | |
|---|---|---|---|---|
| 10,839,657 | B2 * | 11/2020 | Wakuda | ................ F16D 57/002 |
| 10,976,827 | B2 * | 4/2021 | Battlogg | ................ A61F 2/6607 |
| 2002/0057152 | A1 * | 5/2002 | Elferich | ................ B60K 35/10 |
| | | | | 335/220 |

(Continued)

FOREIGN PATENT DOCUMENTS

| | | |
|---|---|---|
| CN | 102879174 A | 1/2013 |
| CN | 108196209 A | 6/2018 |

(Continued)

*Primary Examiner* — Jason M Mandeville
(74) *Attorney, Agent, or Firm* — NKL Law; Jae Youn Kim

(57) ABSTRACT

The present invention relates to a method of evaluating a magneto-rheological rotating load device. In a method of evaluating a structural defect of a magneto-rheological rotating load device according to the present invention, the magneto-rheological rotating load device includes a housing, a shaft rotatably installed in the housing, one or more rotary rings connected to the shaft and configured to rotate in conjunction with a rotation of the shaft, a coil part disposed in the housing, and a magneto-rheological fluid with which at least a part in the housing is filled, and the method includes measuring whether a torque value, which is applied when the shaft and the rotary ring rotate, decreases from an initial set value within a predetermined range.

8 Claims, 35 Drawing Sheets

(56) References Cited

U.S. PATENT DOCUMENTS

2019/0146546 A1* 5/2019 Goto .................... G06F 3/0362
　　　　　　　　　　　　　　　　　　　345/184
2020/0043304 A1* 2/2020 Wakuda .................. H02P 6/08

FOREIGN PATENT DOCUMENTS

| JP | 2004-233232 A | 8/2004 |
| KR | 10-1627173 B1 | 6/2016 |
| KR | 10-2357228 B1 | 2/2022 |
| KR | 10-2022-0063081 A | 5/2022 |

\* cited by examiner

METHOD OF EVALUATING MAGNETO-RHEOLOGICAL ROTATING LOAD DEVICE

CROSS-REFERENCE TO RELATED PATENT APPLICATION

This application claims the benefit of Korean Patent Application No. 10-2022-0068842, filed on Jun. 7, 2022, in the Korean Intellectual Property Office, the disclosure of which is incorporated herein in its entirety by reference.

TECHNICAL FIELD

The present invention relates to a method of evaluating a magneto-rheological rotating load device. More specifically, the present invention relates to a method of evaluating a magneto-rheological rotating load device that includes a magneto-rheological fluid and may adjust rotational torque by applying a magnetic field to the magneto-rheological fluid.

BACKGROUND ART

A jog dial is provided in the form of a rotatable circular dial and serves to allow a user to select a predetermined function by rotating the dial clockwise or counterclockwise. The jog dial may be positioned at a particular position when the user removes a force applied to the jog dial, such that the position of the jog dial may be precisely moved.

The application of the jog dials to computer mice and household electrical appliances is gradually expanded, and the jog dials tend to be adopted for vehicles as main input devices of driver information systems (DISs) such as telematics terminals.

A mechanical jog dial in the related art is operated by gear engagement. Therefore, because a rotation tactility of the mechanical jog dial in the related art is a single tactility implemented by the gear engagement, there is a limitation in implementing various tactilities suitable for rotations or usage modes. In addition, the mechanical jog dial only has rotational torque predetermined on the basis of gear engagement, and there is a limitation in freely changing the rotational torque. The rotational torque may be controlled by further providing drive means such as a motor, or a separate vibration motor may be added to provide a haptic function. However, because components and devices for controlling the rotational torque or providing the haptic function need to be added, there is a problem of increases in production costs and volume of an apparatus.

SUMMARY OF THE INVENTION

The present invention has been made in an effort to provide a method of evaluating a magneto-rheological rotating load device, which is capable of generating various tactility patterns in accordance with various input signals during a rotation, thereby allowing a user to feel various high-grade tactilities, unlike a mechanical structure in the related art that implements a single monotonous tactility pattern.

The present invention has also been made in an effort to provide a method of evaluating a magneto-rheological rotating load device, in which a haptic function is embedded to change rotational torque, reduce production cost, and easily miniaturize the device.

The present invention has also been made in an effort to provide a method of evaluating a magneto-rheological rotating load device, which is capable of being variously applied for proper purposes by using shear properties or viscosity of a magneto-rheological fluid.

The present invention has also been made in an effort to provide a method of evaluating a magneto-rheological rotating load device, which is capable of preventing a magneto-rheological fluid from leaking to the outside.

The present invention has also been made in an effort to provide a method of evaluating a magneto-rheological rotating load device, which is capable of measuring separation of a rotary ring from a shaft.

However, the object of the present invention is illustrative, and the scope of the present invention is not limited by the object.

An exemplary embodiment of the present invention provides a method of evaluating a structural defect of a magneto-rheological rotating load device, in which the magneto-rheological rotating load device includes a housing, a shaft rotatably installed in the housing, one or more rotary rings connected to the shaft and configured to rotate in conjunction with a rotation of the shaft, a coil part disposed in the housing, and a magneto-rheological fluid with which at least a part in the housing is filled, the method including: measuring whether a torque value, which is applied when the shaft and the rotary ring rotate, decreases from an initial set value within a predetermined range.

According to the exemplary embodiment of the present invention, the magneto-rheological rotating load device may further include a controller configured to control a magnetic field applied to the magneto-rheological fluid by the coil part, and the controller may determine that the structural defect has occurred when the measurement result indicates that the torque value, which is applied when the shaft and the rotary ring rotate, decreases from the initial set value within the predetermined range.

According to the exemplary embodiment of the present invention, the initial set value of the torque value may be a value when a magnetic field with predetermined intensity is applied to the magneto-rheological fluid from the coil part.

According to the exemplary embodiment of the present invention, the controller may determine that the structural defect has occurred when the measurement result indicates that the torque value decreases by 30% or more (100% or less) from the initial set value of the torque value.

According to the exemplary embodiment of the present invention, the number of rotary rings may be N (N is a natural number larger than three), and the controller may determine that the structural defect has occurred when the measurement result indicates that the torque value decreases by 100/N % or more (100% or less) from the initial set value of the torque value.

According to the exemplary embodiment of the present invention, the initial set value of the torque value may be stored in advance in the controller.

According to the exemplary embodiment of the present invention, a torque sensor may be connected to a shaft portion of the shaft, which is disposed outside the housing, and measure the torque value when the shaft rotates.

According to the exemplary embodiment of the present invention, the controller may transmit a structural defect notification signal to an external device connected to the magneto-rheological rotating load device when the controller determines that the structural defect occurs on the magneto-rheological rotating load device.

According to the exemplary embodiment of the present invention, the magneto-rheological rotating load device may further include a structural defect display part, and the controller may operate the structural defect display part when the controller determines that the structural defect occurs on the magneto-rheological rotating load device.

According to the present invention configured as described above, it is possible to generate various tactility patterns in accordance with various input signals during a rotation, thereby allowing a user to feel various high-grade tactilities, unlike a mechanical structure in the related art that implements a single monotonous tactility pattern.

According to the present invention, the haptic function may be embedded to change rotational torque, reduce production cost, and easily miniaturize the device.

According to the present invention, it is possible to implement the applications variously applied for proper purposes by using shear properties or viscosity of the magneto-rheological fluid.

According to the present invention, it is possible to prevent the magneto-rheological fluid from leaking to the outside.

According to the present invention, it is possible to measure the separation of the rotary ring from the shaft.

Of course, the scope of the present invention is not limited by the effects.

DETAILED DESCRIPTION

Figure 1:
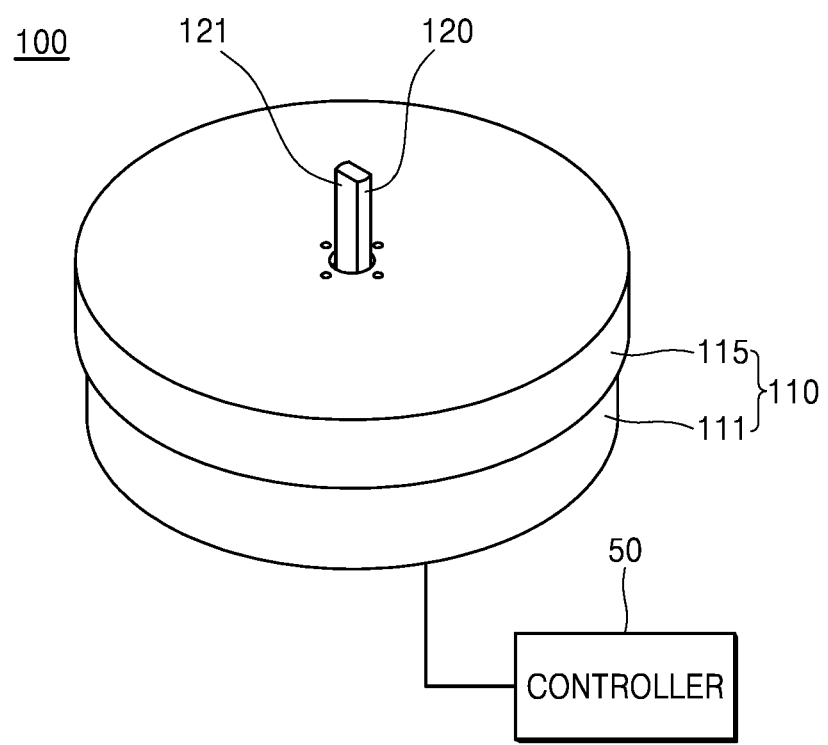
FIG. 1 is a schematic perspective view of a magneto-rheological rotating load device according to a first embodiment of the present invention.

Embodiments will be described with reference to the accompanying drawings. These embodiments will be described in detail enough to carry out the present invention by those skilled in the art. It should be understood that various embodiments of the present invention are different from one another but need not be mutually exclusive. For example, particular shapes, structures, and characteristics described herein in respect to one embodiment may be implemented in other embodiments without departing from the spirit and scope of the present invention. In addition, it should be understood that the position or arrangement of each constituent element in the respective disclosed embodiments may be changed without departing from the spirit and scope of the present invention. Therefore, the following detailed description is not intended to limit the present invention, and the scope of the present disclosure, if adequately explained, is limited only by the appended claims as well as all the scopes equivalent to the appended claims. Like reference numerals in the drawings refer to the same or similar functions throughout several aspects. Lengths, areas, thicknesses, and shapes may be exaggerated for convenience.

Hereinafter, the embodiments of the present invention will be described in detail with reference to the accompanying drawings so that those skilled in the art to which the present invention pertains may easily carry out the present invention.

Figure 2:
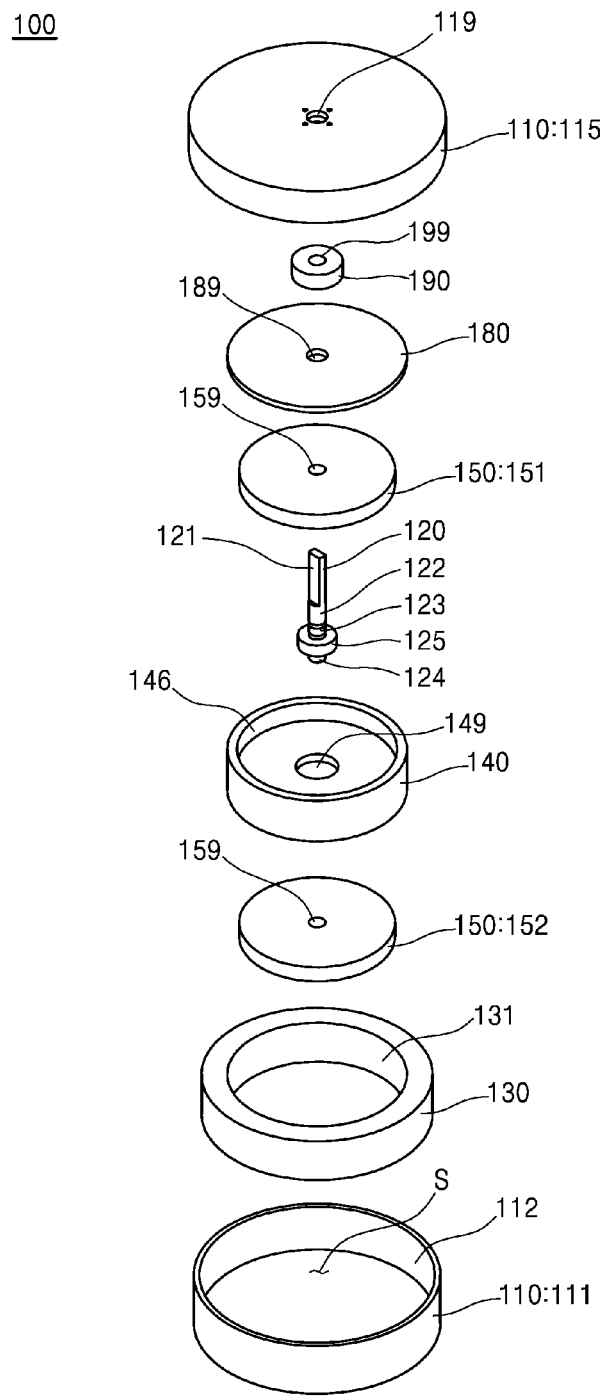
FIG. 2 is a schematic exploded view of the magneto-rheological rotating load device according to the first embodiment of the present invention.
Figure 3:
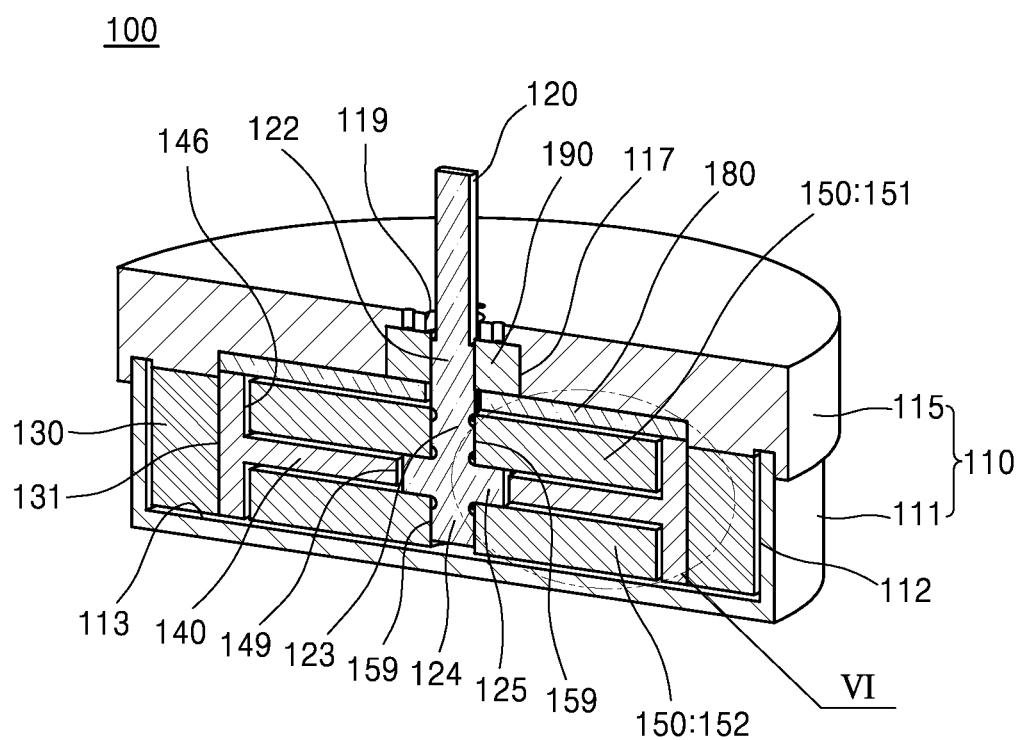
FIG. 3 is a schematic cross-sectional view of the magneto-rheological rotating load device according to the first embodiment of the present invention.
Figure 4:
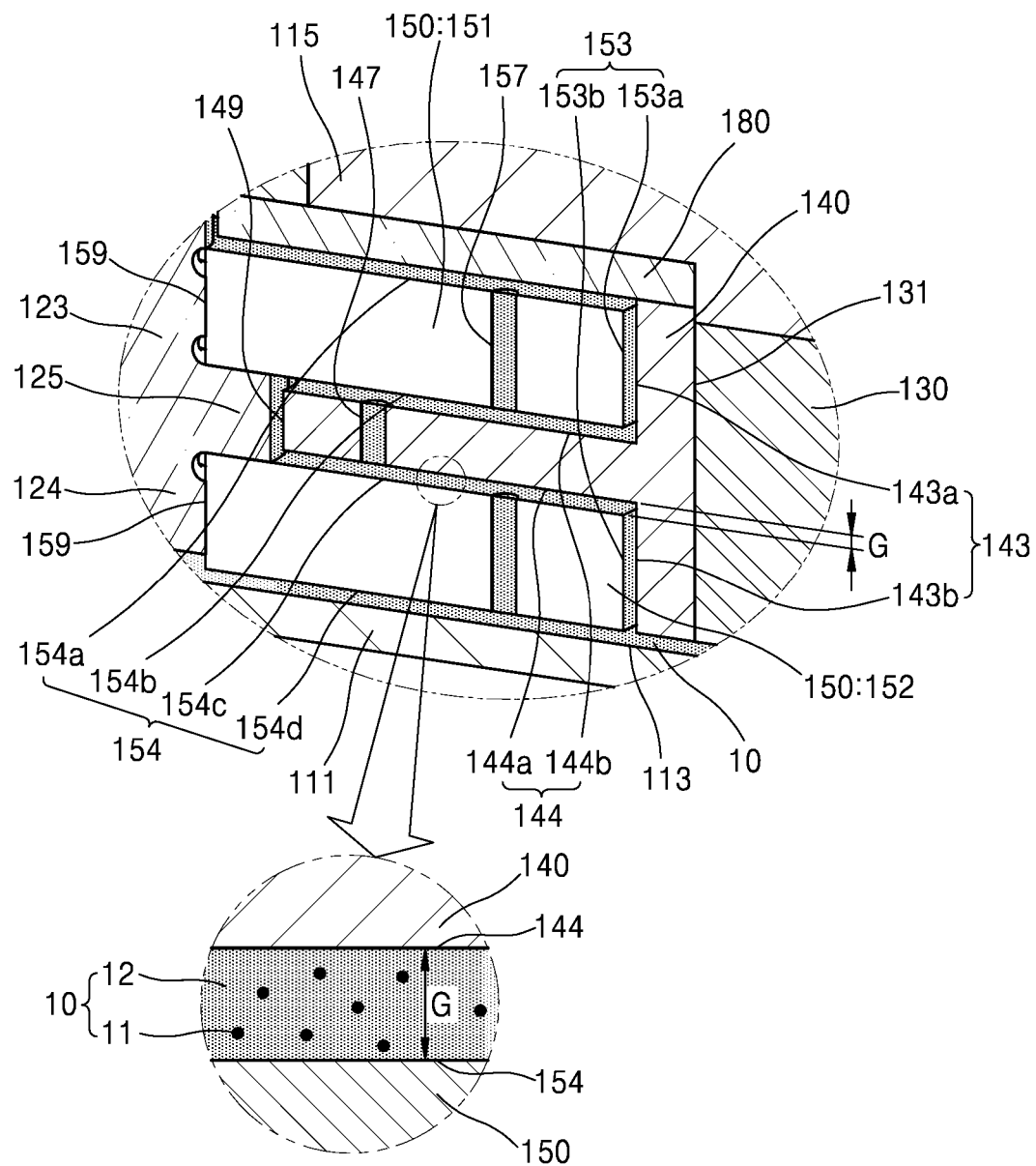
FIG. 4 is an enlarged view of part VI in FIG. 3.

FIG. 1 is a schematic perspective view of a magneto-rheological rotating load device 100 according to a first embodiment of the present invention. FIG. 2 is a schematic exploded view of the magneto-rheological rotating load device 100 according to the first embodiment of the present invention. FIG. 3 is a schematic cross-sectional view of the magneto-rheological rotating load device 100 according to the first embodiment of the present invention. FIG. 4 is an enlarged view of part VI in FIG. 3.

Referring to FIGS. 1 to 4, the magneto-rheological rotating load device 100 according to the first embodiment may include housings 110, a shaft 120, a coil part 130, a yoke part 140, rotary rings 150, and a magneto-rheological fluid 10 and further include a cover part 180 and a bearing part 190.

The housings 110 provide a space S in which other constituent elements are disposed. The constituent elements of the magneto-rheological rotating load device 100 may be disposed in the housings 110, and the remaining empty space in the housings 110 may be filled with the magneto-rheological fluid 10. The housings 110 may have an approximately cylindrical shape to provide the space S in which the shaft 120 and the rotary rings 150 may rotate. The housings 110 may have other shapes as long as the housings 110 may provide the space S in which the shaft 120 and the rotary rings 150 may rotate.

For example, the housings 110 (111 and 115) may include: a first housing 111 configured to provide the space S in which the coil part 130, the yoke part 140, the rotary rings 150, and the magneto-rheological fluid 10 are disposed; and a second housing 115 configured to cover an upper side of the first housing 111 and seal the internal space S of the first housing 111.

The space S of the first housing 111 may be sealed as the open upper side of the first housing 111 is covered by the second housing 115 after the constituent elements of the magneto-rheological rotating load device 100 and the magneto-rheological fluid 10 are disposed in the space S of the first housing 111. The present invention is advantageous in that the magneto-rheological rotating load device 100 may be completely assembled as the magneto-rheological fluid 10 may be sealed only by the simple structures of the first and second housings 111 and 115 (110).

The shaft 120 may be rotatably installed at a center of the housings 110. The shaft 120 may be elongated in a vertical direction, and the rotary rings 150 (151 and 152) may be fitted with shaft portions 123 and 124 of the shaft 120, such that the shaft 120 and the rotary rings 150 may rotate together. Alternatively, the shaft 120 and the rotary rings 150 may be integrated.

An edge portion 121 may be formed at an upper end of the shaft 120. A user grip means (not illustrated) such as a dial may be fitted with the edge portion 121 at the upper end of the shaft 120, such that a rotational force may be easily transmitted to the shaft portion of the shaft 120.

A lower end portion 124 of the shaft 120 may be inserted into a through-hole 159 of a rotary ring 152 of the rotary rings 150, which is disposed at the lowermost side, and the lower end portion 124 of the shaft 120 may be supported on the rotary ring 152 so that a position of an axis does not deviate while the shaft 120 rotates. A lower surface of the lower end portion 124 of the shaft 120 may be spaced apart from an inner lower surface 113 of the first housing 111. That is, the lower end portion 124 of the shaft 120 may be inserted only into a middle portion of the through-hole 159 without penetrating a lower portion of the through-hole 159 of the rotary ring 152. Therefore, the lower end portion 124 of the shaft 120 may be provided in the form floating in the air relative to the inner lower surface 113 of the first housing 111, which makes it possible to prevent the lower end portion 124 of the shaft 120 from mechanically abrading the inner lower surface 113 of the first housing 111. In addition, friction between the shaft 120, the first housing 111, and the rotary rings 150 is minimized, which makes it possible to remarkably reduce mechanical rotational torque when no magnetic field is applied.

Meanwhile, an upper-end shaft portion 122 of the shaft 120, which is positioned in the housings 110, may be supported by being inserted into a through-hole 199 of the bearing part 190. An outer peripheral surface of the upper-end shaft portion 122 of the shaft 120 may be in contact with a surface of the through-hole 199 of the bearing part 190.

Therefore, the plurality of shaft portions 122, 123, and 124 of the shaft 120 may be supported by being inserted into the bearing part 190 and the rotary rings 150 (151 and 152), such that the position of the axis of the shaft may be stably supported. The axis of the lower end portion 124 of the shaft 120 is fixed by the rotary ring 152, and the axis of the upper end portion 122 is fixed by the bearing part 190, such that a fixed axis of the shaft 120 may be provided with deviating from a proper position and distorting pure haptic torque.

The coil part 130 may be disposed inside the housings 110. The coil part 130 may also have a ring shape having an opening portion, i.e., a shape corresponding to a vertical inner wall 112 of the housings 110 so that the magnetic field may be uniformly applied into the housings 110, but the present invention is not limited thereto. The coil part 130 is a solenoid coil. A magnetic field is formed when electric current is applied by the coil part 130. Particles 11 in the magneto-rheological fluid 10 may be arranged in a direction of a magnetic force line or a vertical direction by the formed magnetic field, such that a chain structure may be formed. The chain structure may be formed between a fixed portion and a rotatable portion of the magneto-rheological rotating load device 100 and provide torque to the rotatable portion. A specific process of controlling rotational torque will be described below.

The yoke part 140 may be fixedly installed in the housings 110. The yoke part 140 may be fixedly installed so that an outer surface thereof faces an inner surface 131 of the opening portion of the coil part 130.

The yoke part 140 may have a shape including first and second surfaces 143 and 144 (see FIG. 4) that at least face the rotary rings 150 (151 and 152) to be described below. In other words, an inner surface of the yoke part 140 may at least include the first surfaces 143 and the second surfaces 144. More specifically, the yoke part 140 may have a shape including: the first surfaces 143 (143a and 143b) facing outer peripheral surfaces 153 (153a and 153b) (see FIG. 4) of the rotary rings 150 (151 and 152); and the second surfaces 144 (144a and 144b) facing rotation surfaces 154 (154a, 154b, 154c, and 154d) of the rotary rings 150 (151 and 152) and provided to be perpendicular to the first surfaces 143. The yoke part 140 may have a through-hole 149 formed at a center thereof so that the shaft 120 may penetrate the through-hole 149.

From another standpoint, the yoke part 140 may be provided in the form of a circular disc having the through-hole 149 and further have a vertical wall 146 provided at an outer periphery of the circular disc and formed in a cylindrical shape in the vertical direction. Therefore, a shape of a cross-section (see FIG. 3) of the yoke part 140 may be an approximately 'H' shape when the through-hole 149 is excluded. To increase surface areas facing each other, the rotary rings 150 may be seated in an internal space in which the vertical wall 146 of the yoke part 140 is formed.

The rotary rings 150 may each have a circular disc shape as a whole and be connected to the shaft 120. The rotary rings 150 (151 and 152) may each have the through-hole 159 corresponding to an outer diameter of the axis of the shaft 120, such that the rotary rings 150 (151 and 152) may be fitted with the shaft 120. The rotary rings 150 may rotate relative to the fixedly disposed yoke part 140 while operating in conjunction with the rotation of the shaft 120.

The plurality of rotary rings 150 (151 and 152) may be disposed in the housings 110, and the rotary rings 150 (151 and 152) may be connected to the shaft 120 while being spaced apart from each other at an interval. A gap maintaining portion 125 of the axis of the shaft 120 may be formed to have a predetermined thickness at a middle portion thereof and have a larger outer diameter than the axis of the shaft 120 so that the rotary rings 150 (151 and 152) are spaced apart from each other at an interval. The through-hole 149 of the yoke part 140 may be formed to correspond to the outer diameter of the gap maintaining portion 155. Because the gap maintaining portion 155 is integrated with the rotary rings 150 while defining a stepped portion, only the rotary rings 150 may be sequentially fitted with the shaft 120 without fitting a separate spacer with the shaft 120, such that the rotary rings 150 may be kept spaced apart from each other at an interval.

FIG. 3 illustrates an example in which the yoke part 140 is disposed between the two rotary rings 150 (151 and 152). However, in case that three or more rotary rings are provided, the number of yoke parts 140 may also be increased, or the shape of the yoke part 140 may be changed depending on the number of rotary rings. In this case, the yoke part 140 and the rotary rings 150 may be stacked in the vertical direction while being alternately disposed. The coil part 130 may be fixedly disposed in the internal space S of the first housing 111, the rotary rings 150 and the yoke part 140 may be alternately stacked, the shaft 120 may be inserted, the remaining rotary rings 150 may be stacked (the yoke part 140 may be additionally stacked), the internal space may be filled with the magneto-rheological fluid 10, and then the internal space S may be sealed by the second housing 115, such that the assembling process may be completed.

The present invention is advantageous in that the rotational torque increases as the number of yoke parts 140 and the number of rotary rings 150 increase or the size of the yoke part 140 and the size of the rotary ring 150 increase. In addition, the magneto-rheological rotating load device 100 may be configured by a simple process of alternately stacking the yoke part 140 and the rotary rings 150 in the housings 110 (111 and 115) and assembling and coupling the first and second housings 111 and 115. Because the magneto-rheological rotating load device 100 may be configured by the simple process, it is possible to flexibly cope with a change in size for implementing a torque value suitable for the purpose of use.

The cover part 180 may be disposed at an upper end of the yoke part 140. The cover part 180 may be disposed on a rim of the upper end of the yoke part 140 and seal the internal space of the yoke part 140. Because the internal space of the yoke part 140 is filled with the magneto-rheological fluid 10, the cover part 180 may be substantially used to seal the internal space S of the second housing 115 except for the coil part 130.

The bearing part 190 may be disposed on the cover part 180 so that the shaft portion 122 of the shaft 120 is inserted into the bearing part 190. Further, the internal space S of the housings 110 (111 and 115) may be sealed as the second housing 115 is disposed on the coil part 130, the cover part 180, and the bearing part 190. A stepped accommodation portion 117 may be formed in a lower surface of the second housing 115 to provide a space in which the bearing part 190 is to be disposed. The bearing part 190 may be fixedly supported on the cover part 180 as an outer periphery of the bearing part 190 is supported in the stepped accommodation portion 117, and the shaft portion 112 of the shaft 120 is inserted into a through-hole of the bearing part 190. In addition, another bearing (not illustrated) may be fitted with the axis of the shaft 120 in the internal space of the housing 110.

A predetermined gap G may be defined between the yoke part 140 and the rotary rings 150, and the gap G may be filled with the magneto-rheological fluid 10. Specifically, the gap G may be formed between the first surface 143 of the yoke part 140 and the outer peripheral surface 153 of the rotary rings 150 and between the second surface 144 of the yoke part 140 and the rotation surface 154 of the rotary rings 150. The gap G may also be defined between the housing 110 and the yoke part 140 and between the housing 110 and the rotary rings 150. The rotational torque of the rotary ring 150 may vary depending on changes in properties such as viscosity and rigidity of the magneto-rheological fluid 10 with which the gap G is filled.

A magnitude of torque T, which is generated between the rotary ring 150 and the yoke part 140 during a rotational motion of the rotary ring 150, is obtained as follows from shear stress and a contact area.

$$T=T_c+T_\eta+T_f$$

Here, $T_c$ represents controllable torque generated by an electric field load or a magnetic field load, $T_\eta$ represents viscosity torque generated by viscosity of the magneto-rheological fluid 10 when neither electric field nor magnetic field is applied, and $T_f$ represents frictional torque generated on a mechanical element. $T_c$ is not generated in a no-load state.

Therefore, in the present invention, it is possible to freely change overall torque T of the magneto-rheological rotating load device 100 by controlling a magnetic field to be applied to the magneto-rheological fluid 10 from the coil part 130, i.e., controlling $T_c$.

Figure 5:
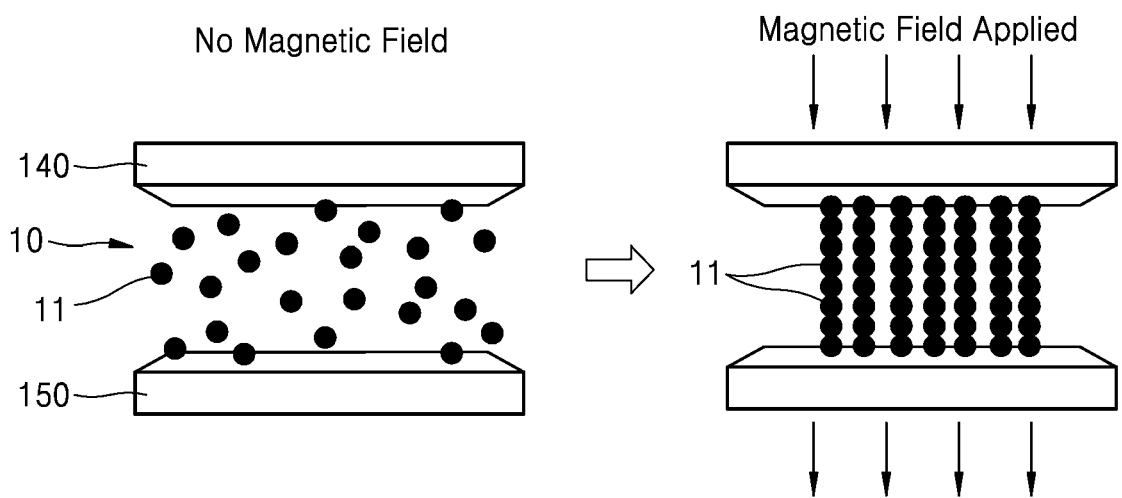
FIG. 5 is a schematic view illustrating a motion of a magneto-rheological fluid in a gap space according to the embodiment of the present invention.

FIG. 5 is a schematic view illustrating a motion of the magneto-rheological fluid 10 in a space of the gap G according to the embodiment of the present invention.

The magneto-rheological rotating load device 100 may further include a controller 50 configured to control intensity, a frequency, a waveform, and the like of the magnetic field generated by the coil part 130. When the user rotates the shaft 120 of the magneto-rheological rotating load device 100, the controller 50 may change torque of the rotary rings 150 by changing the magnetic field to be applied to the coil part 130.

Referring to FIGS. 4 and 5, the gap G between the yoke part 140 and the rotary ring 150 (or the gap G between the housing 110, the yoke part 140, and the rotary ring 150) may be filled with the magneto-rheological fluid 10. The magneto-rheological fluid 10 includes the magnetic particles 11, and a medium 12 provided in the form of a fluid such as oil or water in which the magnetic particles 11 are dispersed.

FIG. 5 illustrates a state in which the magnetic particles 11 are dispersed in the medium 12 in case that no magnetic field is applied (No Magnetic Field). That is, because $T_c$=0 in a no-load state, T has a fixed value, i.e., $T=T_\eta+T_f$. On the contrary, in case that the magnetic field is applied (Magnetic Field Applied), the magnetic particles 11 may define a magnetic chain in a direction of the magnetic force line. The chain may be formed approximately from one surface of the rotary rings 150 to the extent that the chain reaches one surface of the yoke part 140. Therefore, because the $T_c$ value is implemented, torque increases on the basis of $T=T_c+T_\eta+T_f$, such that overall torque may vary depending on a change in $T_c$ value. Therefore, the torque required to rotate the shaft 120 may vary depending on intensity of the magnetic field, a coupling force of the magnetic chain, a frictional shearing force of the yoke part 140 and the rotary ring 150, and the like. To more appropriately form the magnetic chain, the housing 110 may at least include a magnetic part, and the shaft 120, the yoke part 140, and the rotary ring 150 may also include magnetic parts. The entire magnetic part may be made of a magnetic material, or only a part of the magnetic part may be made of a magnetic material. The magnetic material may include iron, nickel, cobalt, ferrite ($Fe_3O_4$), or an alloy thereof, metal nitride, metal oxide, metal carbide, metal silicide, or the like.

A size of the gap G may be about 10 times to 200 times an average diameter value of the magnetic particles 11 in the magneto-rheological fluid 10, more particularly about 20 times the average diameter value of the magnetic particles 11. If the gap G is too small, there is a problem in that the torque value increases in the no-load state, interference may occur at the time of rotating the constituent elements, or it is difficult to perform an assembling process. If the gap G is too large, the large gap G is disadvantageous in miniaturizing the device, and the magnetic chain may not be sufficiently formed in a small magnetic field. For example, diameters of the magnetic particles 11 may be distributed within a range of about 2 to 10 μm, and an average diameter value may be about 5 μm. In this case, the gap G may be at least 0.1 mm or more. In particular, the gap G may be about 0.1 mm to 5 mm. Within the above-mentioned numerical value ranges, the magnetic particles 11 form the magnetic chain in the direction of the magnetic force line, such that the change in Tc value may be generated to the extent that the change in tactility may be transferred to the user's hand.

As the number of magnetic particles 11 in the magneto-rheological fluid 10 increases, the magnetic chain may be more strongly formed, such that maximum torque, which may be generated by the rotating load device, increases. Particularly, the magnetic particles 11 in the magneto-rheological fluid 10 may account for 60 to 95 wt %. If the quantity of the magnetic particles 11 is smaller than 60 wt %, a magnitude of the maximum torque decreases, tactility and rigidity, which may be sufficiently felt by the user, cannot be transferred. If the quantity of the magnetic particles 11 is larger than 95 wt %, the torque value in the no-load state may be increased by an excessively large quantity of magnetic particles 11.

Figure 6:
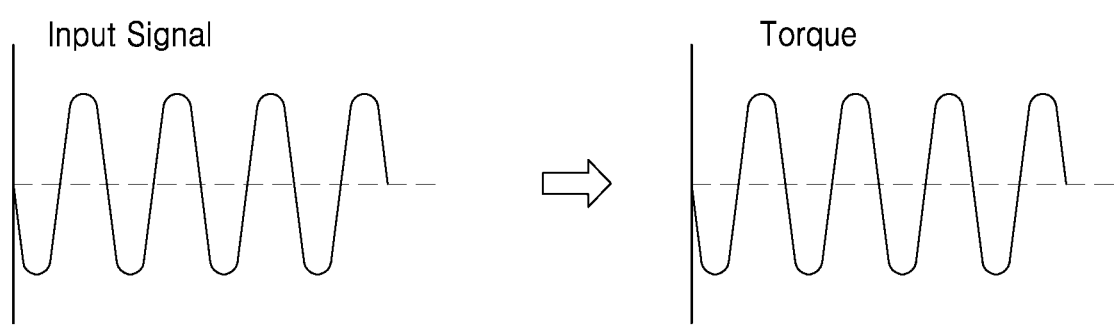
FIG. 6 is a graph illustrating torque in accordance with a magnetic field of the magneto-rheological fluid according to the embodiment of the present invention.

FIG. 6 is a graph illustrating torque in accordance with a magnetic field of the magneto-rheological fluid according to the embodiment of the present invention.

FIG. 6 illustrates a shape in which torque varies depending on intensity of the applied magnetic field. When the coil part 130 applies an alternating current magnetic field, torque of the shaft 120 corresponding to the alternating current magnetic field may be generated. A pattern in which the magnetic chain is formed between the yoke part 140 and the rotary rings 150 may vary depending on a pattern of the magnetic field, and rotational torque of the shaft 120 connected to the rotary rings 150 may vary. Therefore, it is possible to provide various patterns and tactilities to the user who rotates the shaft 120 of the magneto-rheological rotating load device 100.

Meanwhile, the controller 50 may create a signal for transferring tactilities having various patterns to the user on the basis of data received from an external device or the like. The controller may create a signal for controlling rotational torque of the shaft 120 on the basis of events or audio data created on a display of an external device. The controller 50 may transmit a pattern signal to the coil part 130 on the basis of event pattern data corresponding to an effect of the event and audio pattern data corresponding to the audio signal.

For example, in case that the magneto-rheological rotating load device 100 of the present invention is applied as a steering wheel for a racing game, a change in tactility may be applied to the shaft 120 so as to correspond to a road surface state during a process in which an event in which a vehicle moved on the display is performed. Alternatively, a torque value by which the shaft 120 is rotated may vary depending on whether a driving mode is a comfort mode or a sport mode in the racing game.

As another example, the tactility may be implemented in the magneto-rheological rotating load device 100 during a process in which background music or a sound effect is generated in the game. In case that the magneto-rheological rotating load device 100 is applied as a mouse wheel, a torque value may be applied to the extent that the rotation of the shaft 120 connected to the mouse wheel is stopped when a warning sound effect is generated.

The controller 50 may implement tactilities having various patterns, except for the tactility generated by a constant torque value, by controlling an operating frequency, intensity, a waveform, and the like of the coil part 130. Various embodiments of the controller 50 will be described below.

Figure 7:
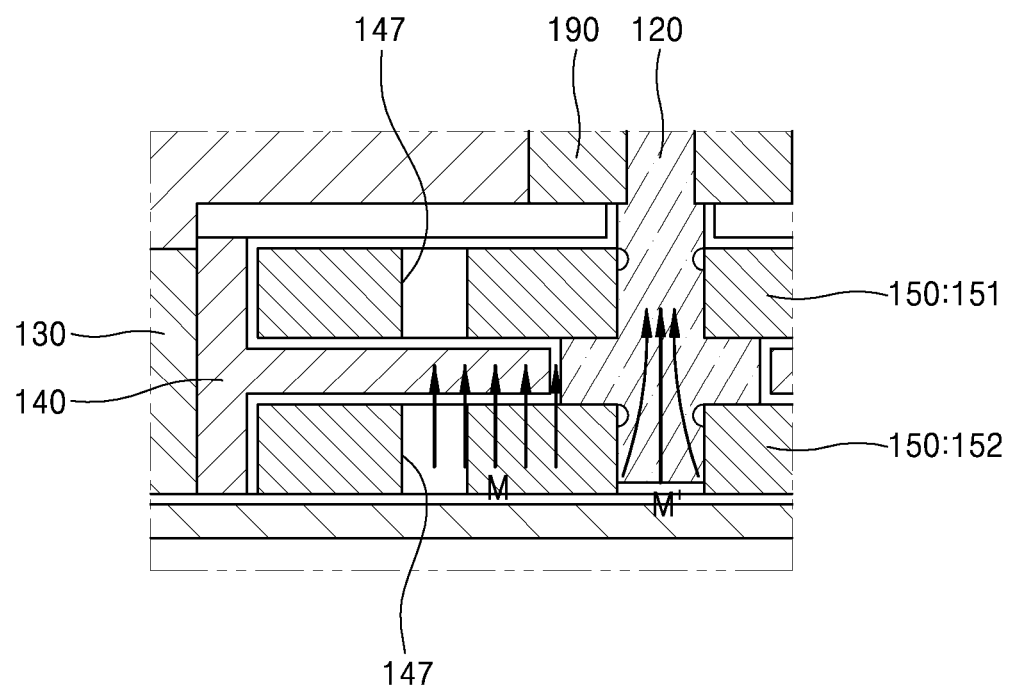
FIG. 7 is a schematic view illustrating magnetic force lines in the shaft made of a magnetic material according to the embodiment of the present invention.

FIG. 7 is a schematic view illustrating magnetic force lines in the shaft made of a magnetic material according to the embodiment of the present invention.

Referring to FIG. 7, motions of magnetic force lines M and M' with respect to the magnetic field applied from the coil part 130 vary depending on the material of the shaft 120. The magnetic field applied to the yoke part 140 and the rotary ring 150 from the coil part 130 may generate the magnetic force line M in an upward direction perpendicular to the horizontal plane of the yoke part 140 and the rotary ring 150. Meanwhile, in case that the shaft 120 includes a magnetic material, a part of the magnetic field applied to the yoke part 140 and the rotary ring 150 from the coil part 130 may leak in the direction of the shaft 120, thereby generating the magnetic force line M'. A concentration effect of the magnetic force line M in the gap G may be decreased by the magnetic force line M' leaking in an axial direction of the shaft 120.

Therefore, the present invention is characterized in that the shaft 120 includes a non-magnetic material. The configuration in which the shaft includes a non-magnetic material means that the entire shaft is made of the non-magnetic material or only a part of the shaft is made of the non-magnetic material. In particular, in case that only a part of the shaft is made of the non-magnetic material, a portion of the shaft 120 at least positioned in the housing 110 (e.g., the shaft portions 122, 123, 124, and 125) needs to be made of the non-magnetic material. According to the embodiment, the shaft 220 may be made of a plastic material. It can be seen that in case that the shaft 120 made of a plastic material is used, the torque value increases from 70 mN·m to 110 mN·m in comparison with the case in which the shaft 120 made of a magnetic material is used. Meanwhile, at least a part of the housing 110 may be made of a magnetic material to improve the concentration effect of the magnetic force line M. A part of the housing 110, which is made of a magnetic material, may be a portion disposed adjacent to the yoke part 140 and the rotary ring 150.

Figure 8:
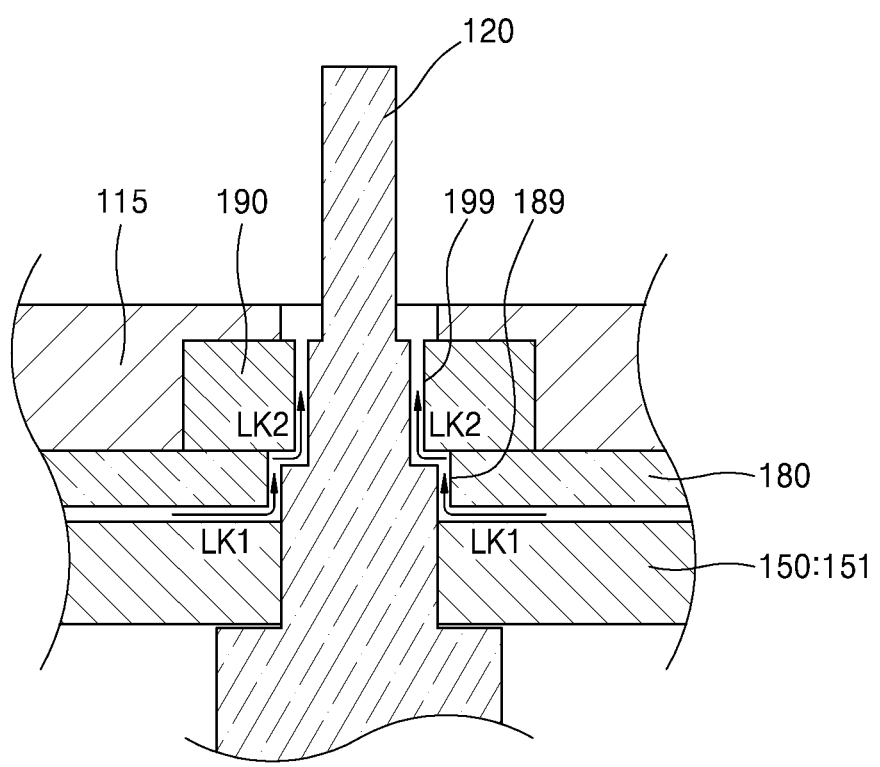
FIG. 8 is a schematic view illustrating a movement route of the magneto-rheological fluid in the magneto-rheological rotating load device according to the first embodiment of the present invention.

FIG. 8 is a schematic view illustrating movement routes LK1 and LK2 of the magneto-rheological fluid in the magneto-rheological rotating load device 100 according to the first embodiment of the present invention.

Referring to FIG. 8, the magneto-rheological rotating load device 100 according to the first embodiment has a structure in which the cover part 180 and the bearing part 190 are disposed on an upper portion of the rotary ring 150 (151). However, because the shaft 120 needs to rotate in a state of being fitted into the through-hole 199 of the bearing part 190, a gap may be present between the bearing part 190 and the shaft portion 122 of the shaft 120. The magneto-rheological fluid 10 existing in the gap G between the cover part 180 and the rotary ring 150 (151) may leak into a gap between the cover part 180 and the shaft 120 and a gap between the bearing part 190 and the shaft 120. In FIG. 8, among gap routes through which the magneto-rheological fluid 10 leaks, LK1 indicates a gap route between the cover part 180 and the shaft 120, and LK2 indicates a gap route between the bearing part 190 and the shaft 120.

When the magneto-rheological fluid 10 leaks through the gap routes LK1 and LK2, the magneto-rheological fluid 10 may adversely affect the rotational force of the bearing part 190. In particular, when the amount of the magneto-rheological fluid 10 in the magneto-rheological rotating load device 100 changes as the magneto-rheological fluid 10 leaks to the outside, it is difficult to control torque with desired intensity, such that the sealing of the magneto-rheological fluid 10 is considered important. Hereinafter, a means for sealing the magneto-rheological fluid 10 will be further described with reference to a magneto-rheological rotating load device 200 according to a second embodiment.

Figure 9:
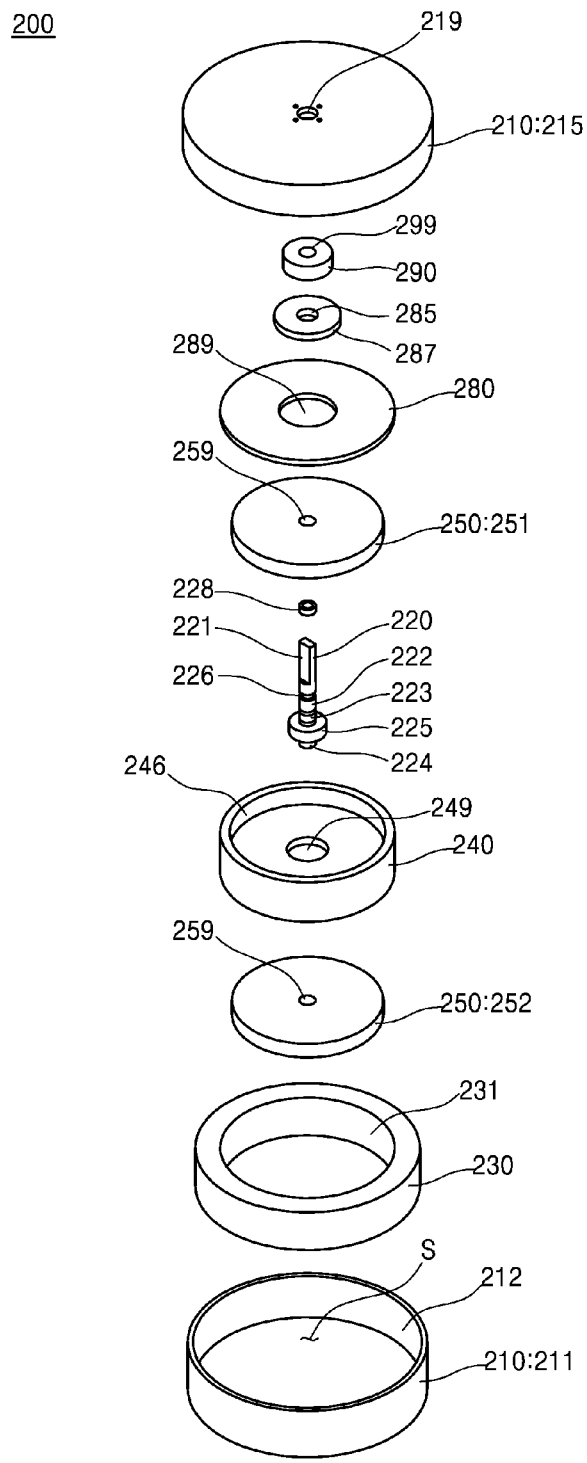
FIG. 9 is a schematic exploded view of a magneto-rheological rotating load device according to a second embodiment of the present invention.
Figure 10:
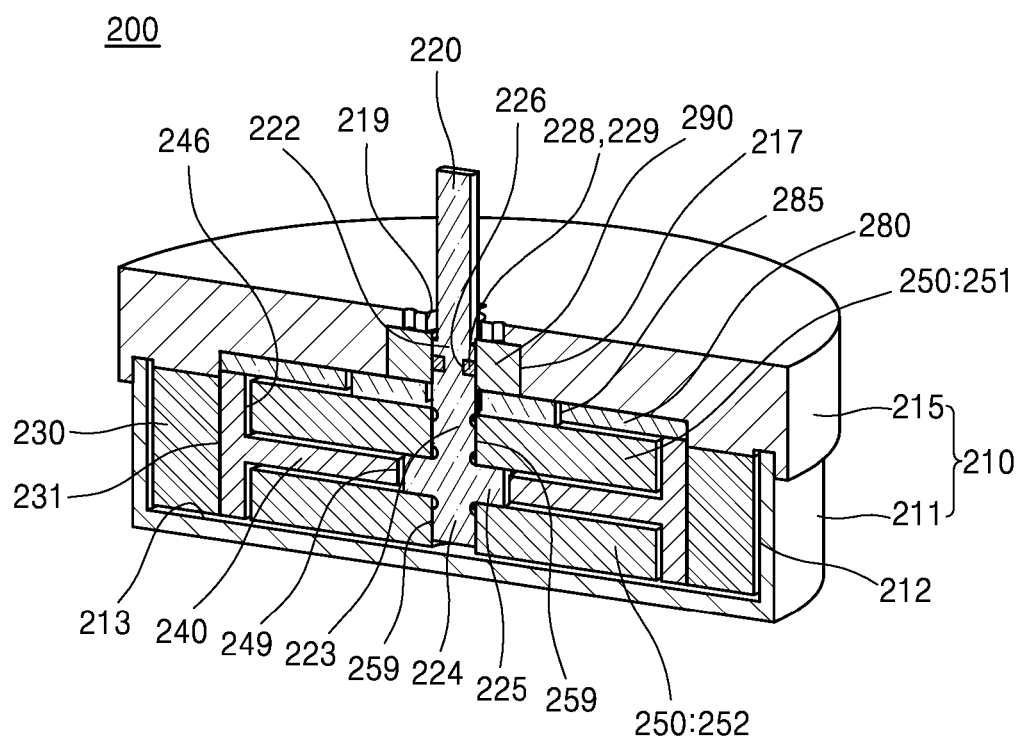
FIG. 10 is a schematic cross-sectional view of the magneto-rheological rotating load device according to the second embodiment of the present invention.
Figure 11:
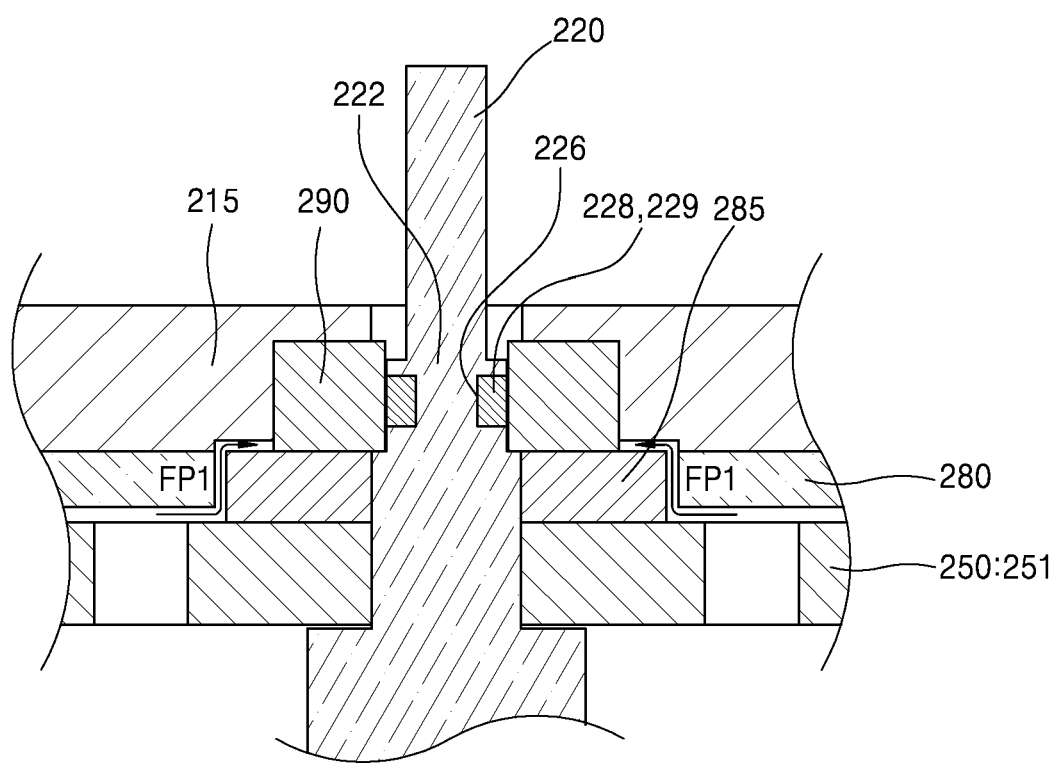
FIG. 11 is a schematic view illustrating a movement route of a magneto-rheological fluid in the magneto-rheological rotating load device according to the second embodiment of the present invention.

FIG. 9 is a schematic exploded view of the magneto-rheological rotating load device 200 according to the second embodiment of the present invention. FIG. 10 is a schematic cross-sectional view of the magneto-rheological rotating load device 200 according to the second embodiment of the present invention. FIG. 11 is a schematic view illustrating a movement route FP1 of the magneto-rheological fluid in the magneto-rheological rotating load device 200 according to the second embodiment of the present invention. Hereinafter, only the components different from the components in the first embodiment in FIGS. 1 to 4 will be described, and a description of the same components is substituted with the above-mentioned description. Reference numerals of the same components in the first and second embodiments may be expressed as numbers in 100s and 200s corresponding to one another. Hereinafter, a description of the components illustrated in FIGS. 9 to 11 is substituted with the description described above with reference to FIGS. 1 to 4 unless separately described.

Referring to FIGS. 9 to 11, the magneto-rheological rotating load device 200 according to the second embodiment may include housings 210, a shaft 220, a coil part 230, a yoke part 240, rotary rings 250, a cover part 280, a bearing part 290, the magneto-rheological fluid 10 and further include a means for preventing a leak of the magneto-rheological fluid 10. The housings 210, the coil part 230, the yoke part 240, and the rotary rings 250 may be substantially identical to the housings 110, the coil part 130, the yoke part 140, and the rotary rings 150.

According to the embodiment, the leak prevention means may be an O-ring 228. The O-ring 228 may be fitted with an outer peripheral surface of the shaft 220. An O-ring support groove 226 may be formed in the outer peripheral surface of the shaft 220, particularly, an upper-end shaft portion 222 of the shaft 220 that corresponds to a position of the bearing part 290. Further, the O-ring 228 may be fitted to surround the O-ring support groove 226. Because the O-ring support groove 226 is a groove formed inward in the upper-end shaft portion 222 of the shaft, the O-ring 228 may be fitted so as not to be separated in the upward/downward direction.

When the O-ring 228 is fitted with the shaft 220, an outer peripheral surface of the O-ring 228 may come into contact with a through-hole 299 formed in a central portion of the bearing part 290. Therefore, the O-ring 228 may block the gap route LK2 between the bearing part 190 and the shaft 120 described in FIG. 8, thereby preventing a leak of the magneto-rheological fluid 10.

According to the embodiment, the leak prevention means may be a grease part 229. The grease part 229 may be formed at the same position as the O-ring 228. The grease part 229 may be applied in the groove of the O-ring support groove 226 of the shaft 220. Alternatively, the grease part 229 may be applied to the gap route LK1 between the cover part 180 and the shaft 120 and the gap route LK2 between the bearing part 190 and the shaft 120, which are the routes through which the magneto-rheological fluid 10 may leak, as described above with reference to FIG. 8. Alternatively, the grease part 229 may be applied to the gap between the upper end of the yoke part 240 and the cover part 280.

According to the embodiment, the leak prevention means may be a covering 285. The covering 285 may be disposed in an inner surface of a through-hole 289 of the cover part 280. Further, the bearing part 290 may be disposed on an upper portion of the covering 285. In the magneto-rheological rotating load device 100 of the first embodiment, the bearing part 190 is disposed on an upper surface of the cover part 180 without the covering 285. Therefore, the gap route LK1 (see FIG. 8) for the magneto-rheological fluid is formed between the cover part 180 and the shaft 120. In contrast, referring to FIG. 11, in the magneto-rheological rotating load device 200 of the second embodiment, the through-hole 289 of the cover part 280 has a size corresponding to an outer diameter of the covering 285, and an axis of the shaft 220 passes through a through-hole 287 of the covering 285. The bearing part 290 is tightly disposed on the upper portion of the covering 285, such that no gap is formed therebetween. Therefore, the gap route FP1 for the magneto-rheological fluid is restricted from an upper portion of the rotary ring 250 (251) to an outer surface of the covering 285. The gap route FP1 does not extend to a portion between the bearing part 290 and the shaft 220, which makes it possible to prevent the magneto-rheological fluid from leaking to the outside.

Meanwhile, the leak prevention means in the above-mentioned multiple embodiments may be complexly applied. The configurations of the O-ring 288, the grease part 229, and the covering 285 may be combined to prevent the magneto-rheological fluid from leaking to the outside.

Figure 12:
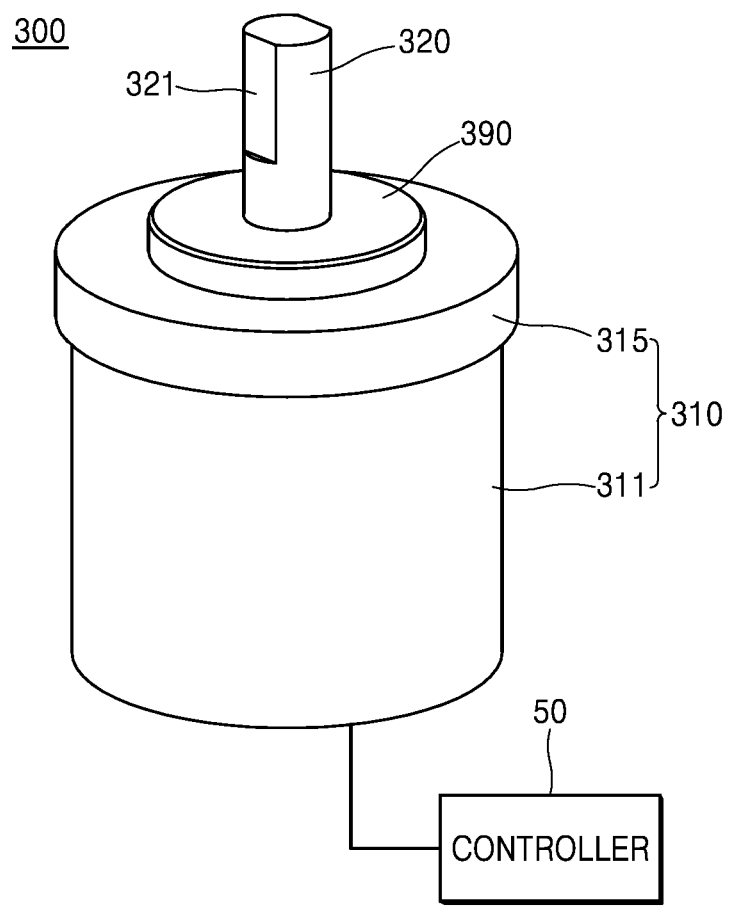
FIG. 12 is a schematic perspective view of a magneto-rheological rotating load device according to a third embodiment of the present invention.
Figure 13:
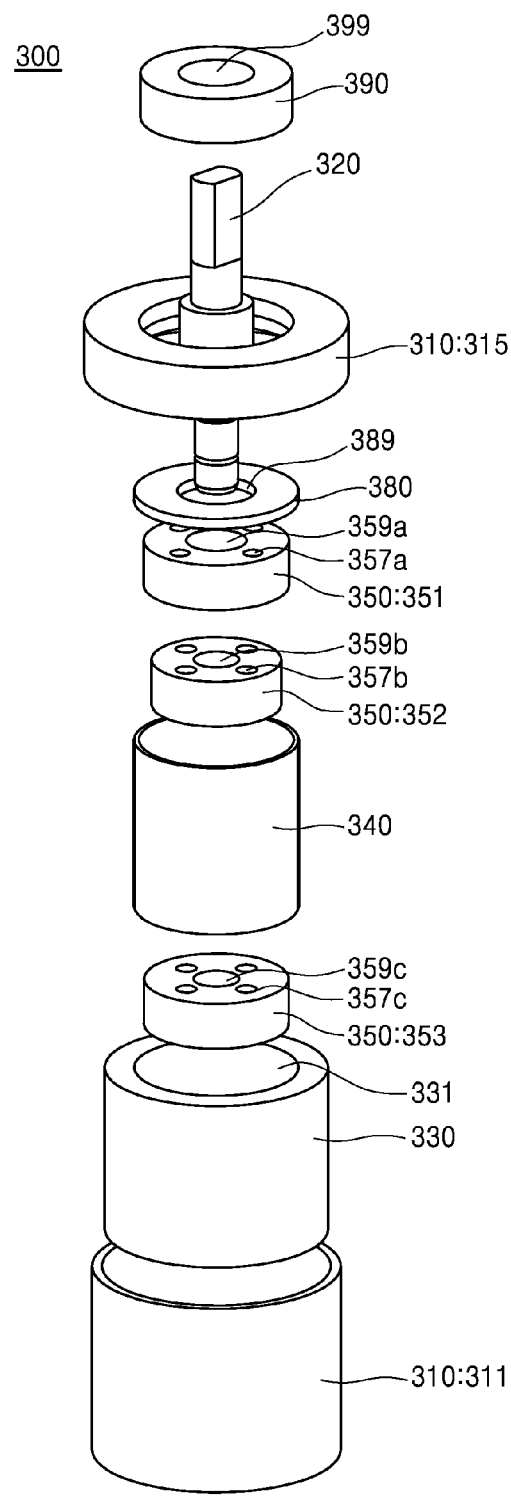
FIG. 13 is a schematic exploded view of the magneto-rheological rotating load device according to the third embodiment of the present invention.
Figure 14:
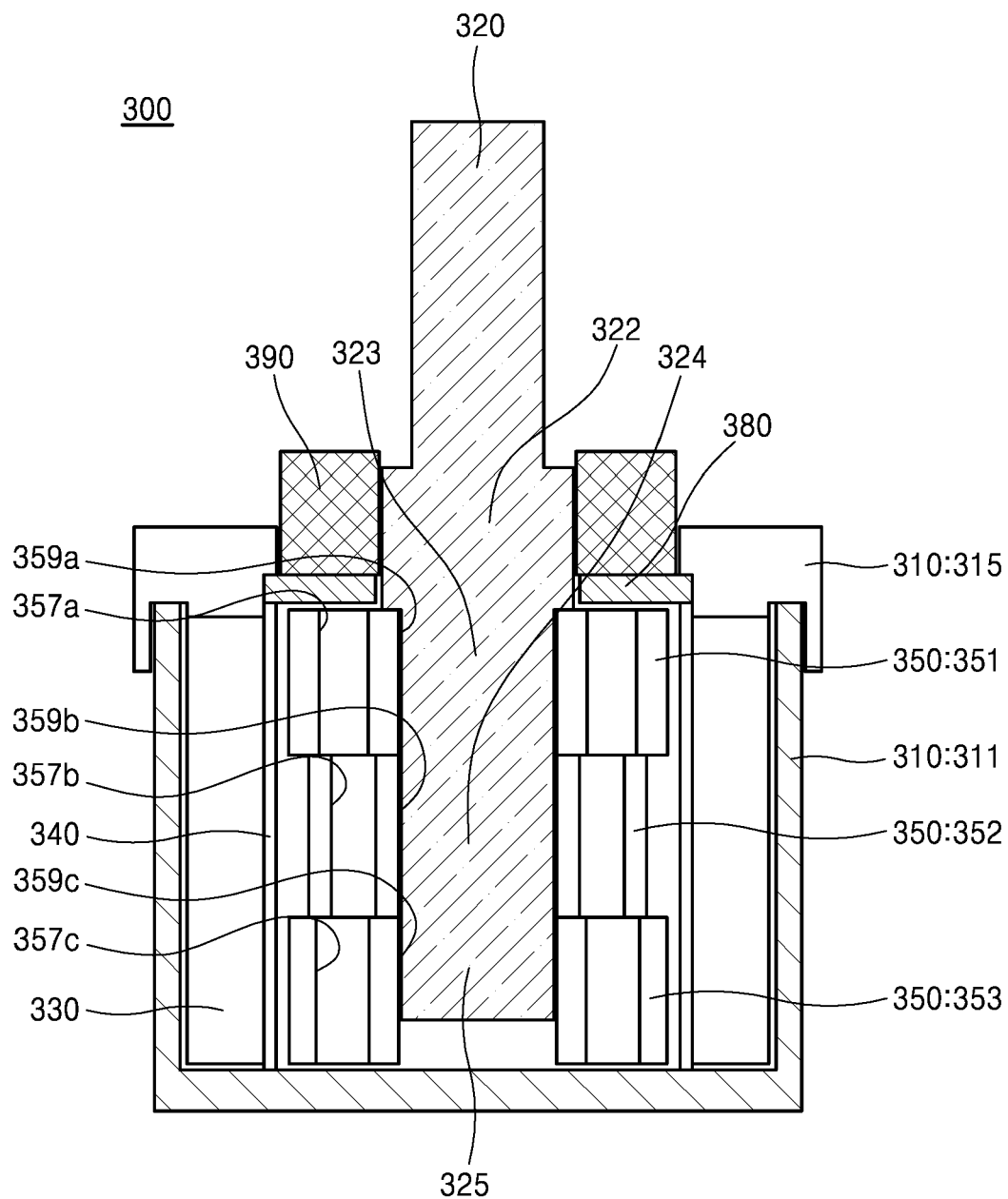
FIG. 14 is a schematic cross-sectional view of the magneto-rheological rotating load device according to the third embodiment of the present invention.

FIG. 12 is a schematic perspective view of a magneto-rheological rotating load device 300 according to a third embodiment of the present invention. FIG. 13 is a schematic exploded view of the magneto-rheological rotating load device 300 according to the third embodiment of the present invention. FIG. 14 is a schematic cross-sectional view of the magneto-rheological rotating load device 300 according to the third embodiment of the present invention. Hereinafter, only the components different from the components in the first embodiment in FIGS. 1 to 4 will be described, and a description of the same components is substituted with the above-mentioned description. Reference numerals of the same components in the first and third embodiments may be expressed as numbers in 100s and 300s corresponding to one another.

Referring to FIGS. 12 to 14, the magneto-rheological rotating load device 300 may include housings 310, a shaft 320, a coil part 330, a yoke part 340, and rotary rings 350 and further include a cover part 380 and a bearing part 390. The housing 310, the coil part 330, the cover part 380, and the bearing part 390 may be substantially identical to those in the first embodiment in FIGS. 1 to 4, except for a difference between some shapes.

An edge portion 321 may be formed at an upper end of the shaft 320. A user grip means (not illustrated) such as a dial may be fitted with the edge portion 321 at the upper end of the shaft 320, such that a rotational force may be easily transmitted to the shaft portion of the shaft 320.

A diameter of an axis of the shaft 320 positioned in the housings 310 may be constant or decrease downward. Therefore, an assembling process may be performed by simply inserting the shaft 320 from above to below in a state in which the rotary rings 350 (351 to 353) are stacked. The rotary rings 350 (351 to 353) are disposed in the vertical direction while being in contact with each other or kept spaced apart from each other at a predetermined interval. The shaft 320 may be inserted into through-holes 357a, 357b, and 357c of the rotary rings 350.

A lower end portion 325 of the shaft 320 may be inserted into a through-hole 359c of a rotary ring 353 of the rotary rings 350, which is disposed at the lowermost side, and the lower end portion 325 of the shaft 320 may be supported on the rotary ring 353 so that a position of an axis does not deviate from a proper position while the shaft 320 rotates. A lower surface of the lower end portion 325 of the shaft 320 may be spaced apart from an inner lower surface of the first housing 311. That is, the lower end portion 325 of the shaft 320 may be inserted only into a middle portion of the through-hole 359c without penetrating a lower portion of the through-hole 359c of the rotary ring 353. Therefore, the lower end portion 325 of the shaft 320 may be provided in the form floating in the air relative to the inner lower surface of the first housing 311, which makes it possible to prevent the lower end portion 325 of the shaft 320 from mechanically abrading the inner lower surface of the first housing 311.

The coil part 330 may be disposed inside the housings 310. The coil part 330 may also have a ring shape having an opening portion, i.e., a shape corresponding to a vertical inner wall of the housings 310 so that the magnetic field may be uniformly applied into the housings 310, but the present invention is not limited thereto. The particles 11 in the magneto-rheological fluid 10 are arranged in the direction of the magnetic force line by the magnetic field formed by the coil part 330, such that the chain structure may be formed, and the rotational torque may be controlled.

The yoke part 340 may be fixedly installed in the housings 310. The yoke part 340 may be fixedly installed so that an outer surface thereof faces an inner surface 331 of the opening portion of the coil part 330. Like the housings 310, the yoke part 340 may also have an approximately cylindrical shape to provide a space in which the shaft 320 and the rotary rings 350 may rotate. The yoke part 340 may have an inner diameter larger than an outer diameter of the rotary ring 350.

At least one rotary ring 350 may be disposed in the internal space of the yoke part 340. The rotary rings 350 (351, 352, and 353) may be disposed and stacked, the predetermined gap G may be formed between the rotary rings 350 (351, 352, and 353) and the inner surface of the yoke part 340, and the gap G may be filled with the magneto-rheological fluid 10. The particles 11 in the magneto-rheological fluid 10 are arranged in the direction of the magnetic force line by the magnetic field formed by the coil part 330, such that the chain structure may be formed, and the rotational torque may be controlled. In the present specification, an example is described in which three rotary rings 350 (351, 352, and 353) are disposed, but the number of rotary rings 350 may be changed.

Meanwhile, the cover part 380 may be disposed at an upper end of the yoke part 340. The cover part 380 may be disposed on a rim of the upper end of the yoke part 340 and seal the internal space of the yoke part 340. Because the internal space of the yoke part 340 is filled with the magneto-rheological fluid 10, the cover part 380 may be substantially used to seal an internal space S of a second housing 315 except for the coil part 330.

In the magneto-rheological rotating load device 300 according to the third embodiment, because the yoke part is excluded from the portion between the rotary rings 350, the rotational torque may decrease in comparison with the first embodiment. In contrast, the magneto-rheological rotating load device 300 is advantageous in that the structure thereof is simplified, and manufacturing costs are reduced. Therefore, the magneto-rheological rotating load device 300 may be applied in consideration of required intensity of the rotational torque and manufacturing costs. For example, like the mouse wheel, the magneto-rheological rotating load device 300 may only have low rotational torque and be applied to the field in which manufacturing costs may be reduced.

Figure 15:
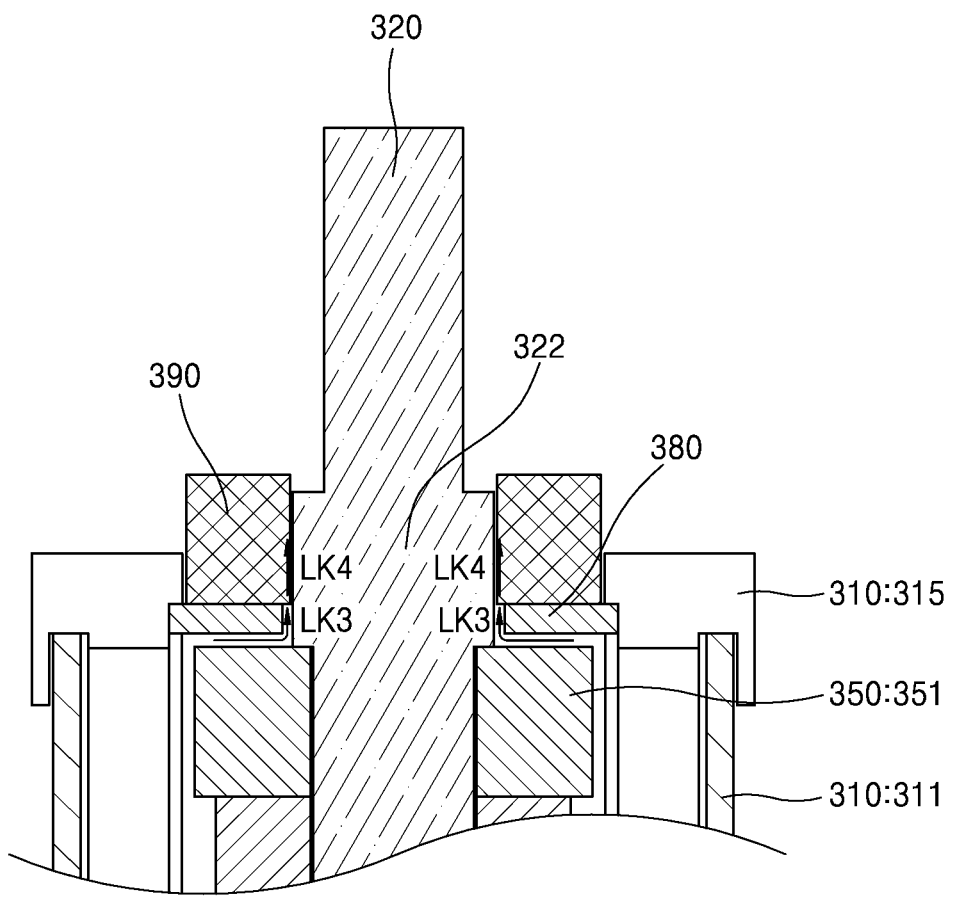
FIG. 15 is a schematic view illustrating a movement route of a magneto-rheological fluid in the magneto-rheological rotating load device according to the third embodiment of the present invention.

FIG. 15 is a schematic view illustrating a movement route LK3 for the magneto-rheological fluid according to the third embodiment of the present invention.

Referring to FIG. 15, the magneto-rheological rotating load device 300 according to the third embodiment has a structure in which the cover part 380 and the bearing part 390 are disposed on an upper portion of the rotary ring 350 (351). Because the shaft 320 needs to rotate in a state of being fitted into a through-hole 399 of the bearing part 390, a gap may be present between the bearing part 390 and a shaft portion 322 of the shaft 320. The magneto-rheological fluid 10 existing in the gap G between the cover part 380 and the rotary ring 350 (351) may leak into a gap between the cover part 380 and the shaft 320 and a gap between the bearing part 390 and the shaft 320. In FIG. 15, among gap routes through which the magneto-rheological fluid 10 leaks, LK3 indicates a gap route between the cover part 380 and the shaft 320, and LK4 indicates a gap route between the bearing part 390 and the shaft 320. The gap routes LK3 and LK4 are substantially identical to the gap routes LK1 and LK2 described above with reference to FIG. 8. Therefore, to seal the magneto-rheological fluid 10, a means for sealing the magneto-rheological fluid 10 will be described below with reference to a magneto-rheological rotating load device 400 according to a fourth embodiment.

Figure 16:
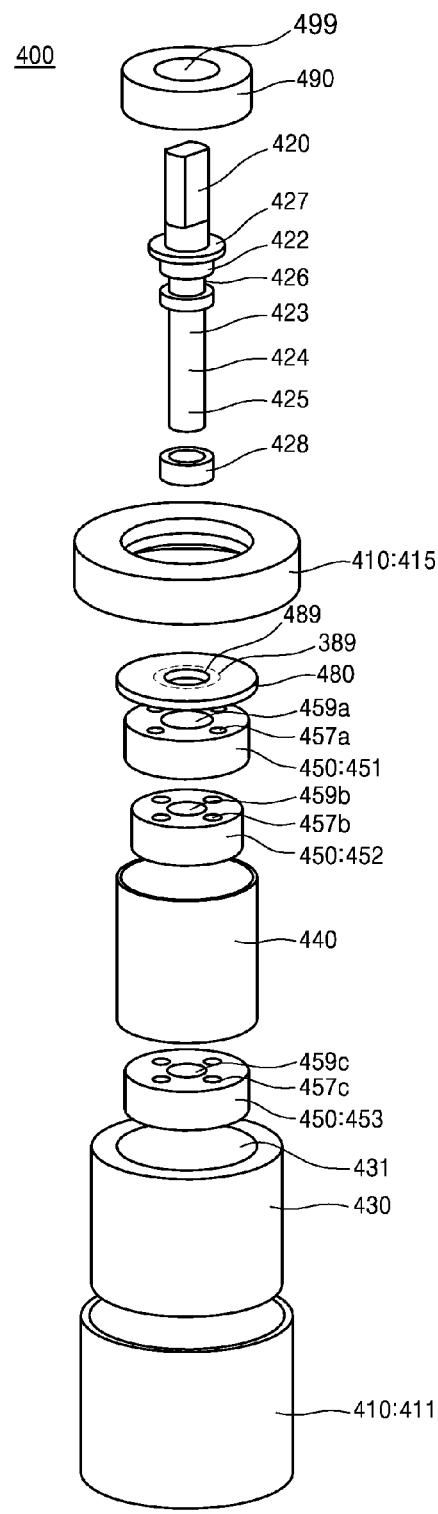
FIG. 16 is a schematic exploded view of a magneto-rheological rotating load device according to a fourth embodiment of the present invention.
Figure 17:
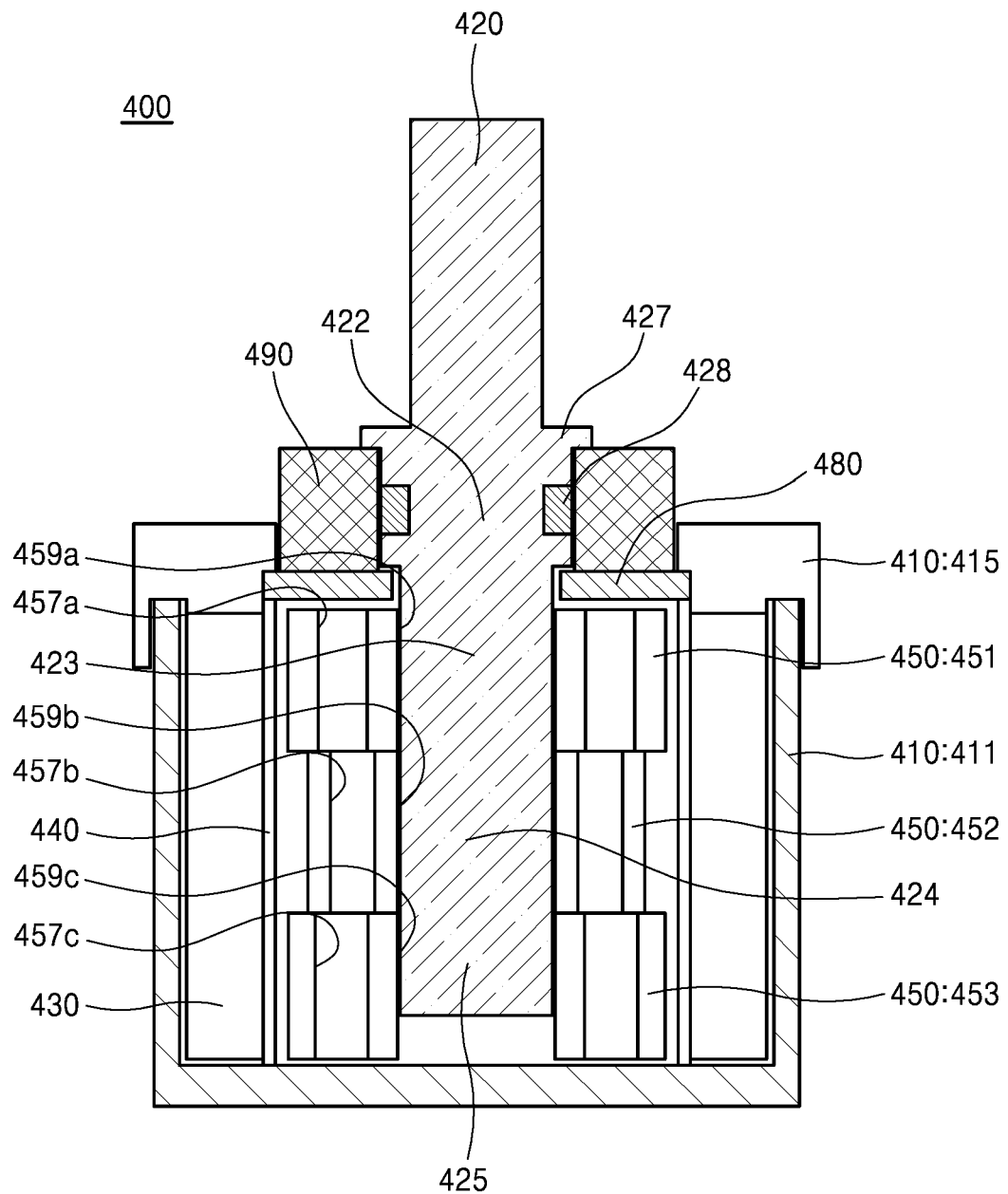
FIG. 17 is a schematic cross-sectional view of the magneto-rheological rotating load device according to the fourth embodiment of the present invention.
Figure 18:
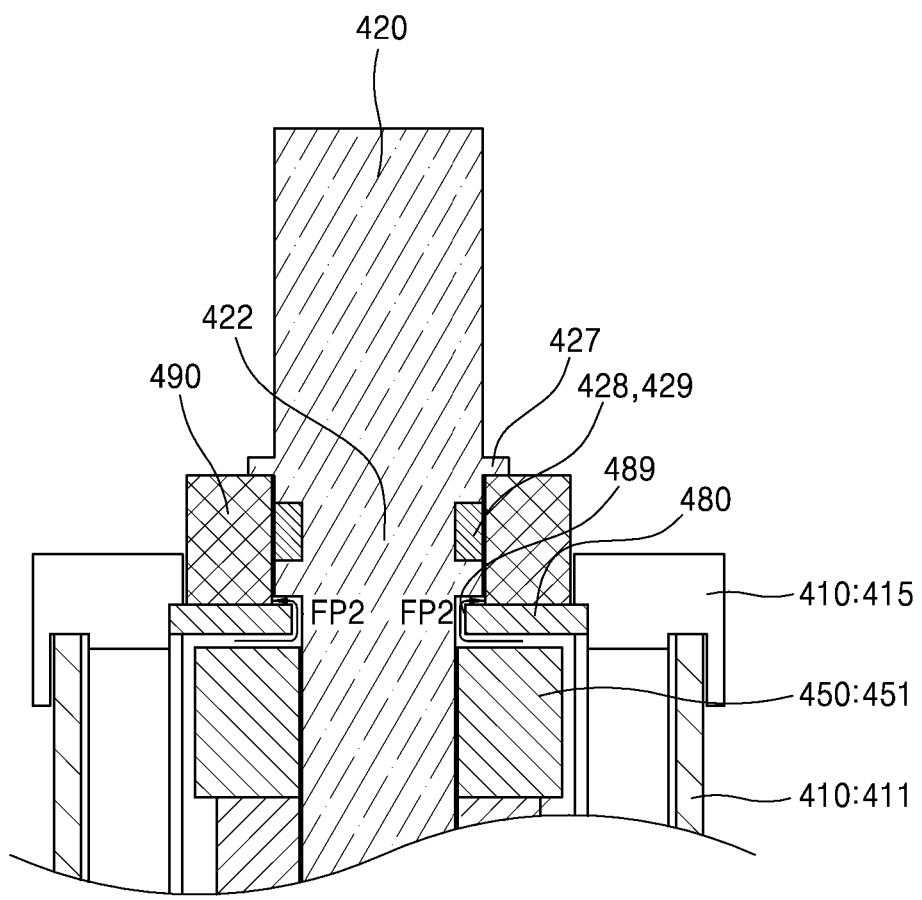
FIG. 18 is a schematic view illustrating a movement route of a magneto-rheological fluid in the magneto-rheological rotating load device according to the fourth embodiment of the present invention.

FIG. 16 is a schematic exploded view of the magneto-rheological rotating load device 400 according to the fourth embodiment of the present invention. FIG. 17 is a schematic cross-sectional view of the magneto-rheological rotating load device 400 according to the fourth embodiment of the present invention. FIG. 18 is a schematic view illustrating a movement route FP2 of the magneto-rheological fluid in the magneto-rheological rotating load device 400 according to the fourth embodiment of the present invention. Hereinafter, only the components different from the components in the third embodiment in FIGS. 12 to 14 will be described, and a description of the same components is substituted with the above-mentioned description. Reference numerals of the same components in the third and fourth embodiments may be expressed as numbers 300s and 400s corresponding to one another. Hereinafter, a description of the components illustrated in FIGS. 16 and 17 is substituted with the description described above with reference to FIGS. 12 to 14 unless separately described.

Referring to FIGS. 16 to 18, the magneto-rheological rotating load device 400 according to the fourth embodiment may include housings 410, a shaft 420, a coil part 430, a yoke part 440, rotary rings 450, a cover part 480, a bearing part 490, the magneto-rheological fluid 10 and further include a means for preventing a leak of the magneto-rheological fluid 10. The housings 410, the coil part 430, the yoke part 440, and the rotary rings 450 may be substantially identical to the housings 310, the coil part 330, the yoke part 340, and the rotary rings 350.

According to the embodiment, the leak prevention means may be an O-ring 428. Because the O-ring 428 is identical to the O-ring 228 in the second embodiment and configured to be inserted into an O-ring support groove 426 of the shaft 420, a specific description will be omitted.

According to the embodiment, the leak prevention means may be a grease part 429. The grease part 429 may be formed at the same position as the O-ring 428. The grease part 429 may be applied in the groove of the O-ring support groove 426 of the shaft 420. Alternatively, the grease part 429 may be applied to the gap route LK3 between the cover part 480 and the shaft 420 and the gap route LK4 between the bearing part 490 and the shaft 420, which are the routes through which the magneto-rheological fluid 10 may leak, as described above with reference to FIG. 15. Alternatively, the grease part 429 may be applied to the gap between the upper end of the yoke part 440 and the cover part 480.

According to the embodiment, the leak prevention means may be an extension hole 489 of the cover part 480. The extension hole 489 may be formed by further extending inward in comparison with a through-hole 389 of the cover part 380 in the third embodiment. In FIG. 16, the through-hole 389 is indicated by a dotted line, and the extension hole 489, which is formed by further extending inward in comparison with the through-hole 389, is indicated by a solid line.

Referring to FIG. 18, because the extension hole 489 is formed by extending in a direction of an inner surface of the cover part 480, the gap route FP2 for the magneto-rheological fluid may be further lengthened. The gap route FP2 for the magneto-rheological fluid extends to the bearing part 490 from an upper portion of the rotary ring 450 (451). In the magneto-rheological rotating load device 300 according to the third embodiment, a diameter of the through-hole 389 of the cover part 380 is equal to or larger than a diameter of the through-hole 399 of the bearing part 390. Therefore, the gap route LK3 (see FIG. 15) for the magneto-rheological fluid has a lateral cross-section having a 'ㄴ' shape in a perpendicular direction between the cover part 380 and the shaft 320. In contrast, referring to FIG. 17, in the magneto-rheological rotating load device 400 according to the fourth embodiment, the gap route FP2 for the magneto-rheological fluid extends to the bearing part 490 from the upper portion of the rotary ring 450 (451), such that the gap route FP2 is lengthened as much as the extension hole 489 extending inward. Therefore, the gap route FP2 for the magneto-rheological fluid has a lateral cross-section having a 'ㄷ' shape in a bypass direction, which makes it possible to prevent the magneto-rheological fluid from leaking directly to the outside.

According to the embodiment, the leak prevention means may be a wing portion 427 of the shaft 420. Referring to FIGS. 16 and 18, the wing portion 427 may protrude laterally from an outer peripheral surface of the shaft 420. The wing portion 427 may be formed at a position at which the wing portion 427 comes into contact with an upper surface of the bearing part 490 when the shaft 420 is fitted with the rotary ring 450 and the bearing part 490. That is, the wing portion 427 may be formed at a position at which the wing portion 427 may cover a through-hole 499 of the bearing part 490. The wing portion 427 may cover the through-hole 499, thereby preventing the magneto-rheological fluid from leaking between the bearing part 490 and the shaft 420.

Meanwhile, the leak prevention means in the above-mentioned multiple embodiments may be complexly applied. The configurations of the O-ring 428, the grease part 429, the extension hole 489, and the wing portion 427 may be combined to prevent the magneto-rheological fluid from leaking to the outside.

Because a mechanical jog dial in the related art provides a single tactility, the mechanical jog dial cannot provide the diversity of the pattern in accordance with various user modes, and there may occur a problem of abrasion caused by an operation of a machine. In addition, there is also a vibration motor type jog dial in addition to the mechanical jog dial. However, the vibration motor type jog dial indirectly transfers the tactility through a vibration motor disposed at a lower side thereof instead of directly transferring the tactility. For this reason, the performance in transferring the tactility deteriorates in comparison with the case in which the tactility is transferred directly.

In contrast, according to the present invention, various torque patterns may be formed in accordance with an input signal of the magnetic field applied by the coil part 130, 230, 330, or 430, such that the user may feel various tactilities. Because the shearing force is changed depending on a change in state of the magneto-rheological fluid 10, a problem of abrasion may be solved, and the tactility may be directly transferred through the shaft 120, 220, 320, or 420.

According to the present invention, the properties may be controlled to be suitable for purposes of various applications in accordance with physical properties of the magneto-rheological fluid 10. For example, when a heavy tactility is required, a magneto-rheological fluid with high viscosity may be applied.

Figure 19:
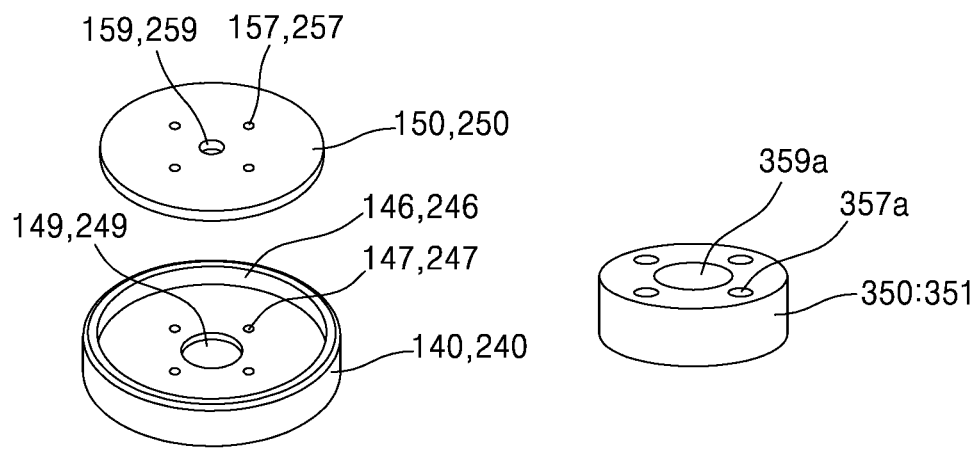
FIG. 19 is a schematic view illustrating a rotary ring and a yoke part having fluid passing holes according to the embodiment of the present invention.
Figure 20:
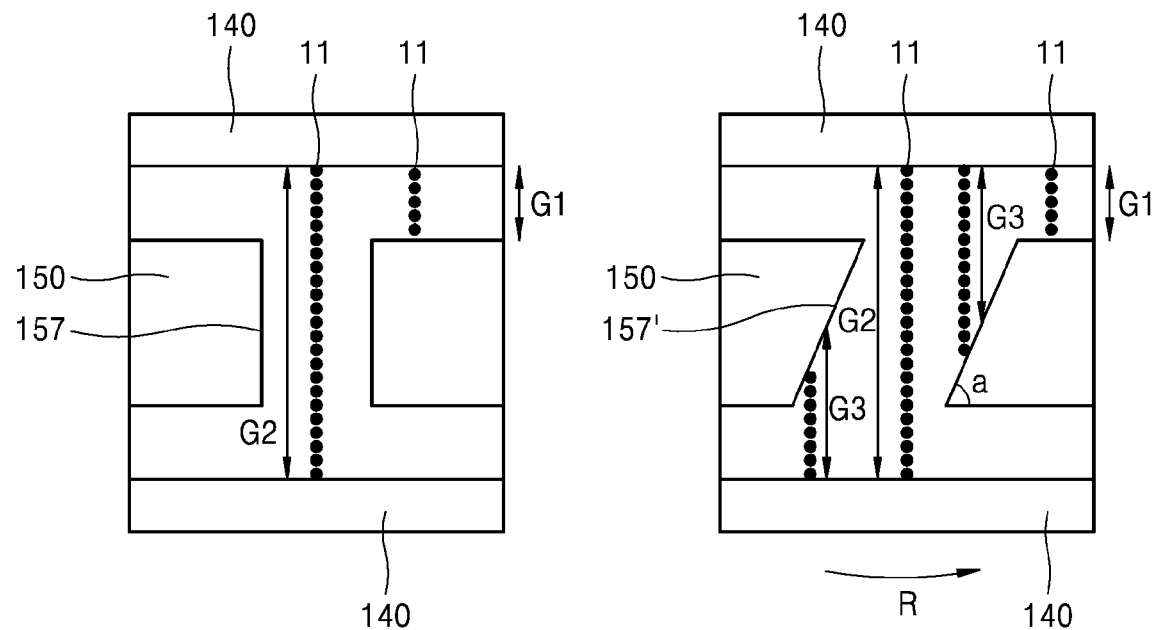
FIG. 20 is a schematic view illustrating a shape of a magnetic chain in the fluid passing hole according to the embodiment of the present invention.
Figure 21:
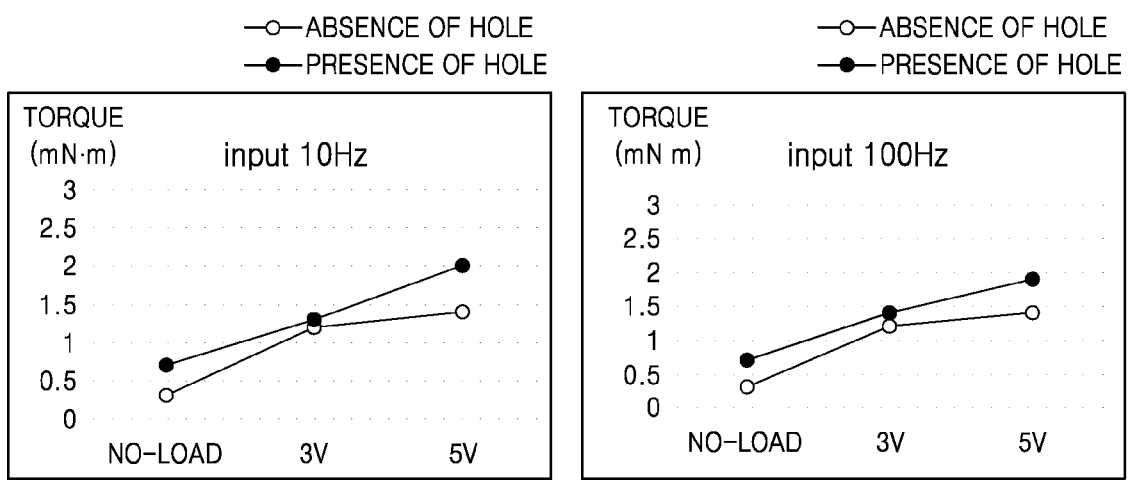
FIG. 21 is a graph illustrating torque values made before and after the fluid passing hole is formed according to one experimental example.

FIG. 19 is a schematic view illustrating the rotary ring 150, 250, or 350 and the yoke part 140 or 240 having fluid passing holes 147, 157, 247, 257, or 357a according to the embodiment of the present invention. FIG. 20 is a schematic view illustrating a shape of a magnetic chain in the fluid passing hole 147, 157, 247, 257, or 357a according to the embodiment of the present invention. FIG. 21 is a graph illustrating torque values made before and after the fluid passing hole is formed according to one experimental example.

Referring to FIG. 19, the yoke part 140 or 240 may have a plurality of fluid passing holes 147 or 247. In addition, the rotary ring 150, 250, or 350 may have a plurality of fluid passing holes 157, 257, or 357a. In addition, like the rotary ring 150, 250, or 350, yoke rings 341 and 342 may also have a plurality of fluid passing holes. The fluid passing hole 147, 157, 247, 257, or 357a may be vertically formed through a horizontal plane such as a surface 144 or 244 of the yoke part 140 or 240 or a rotation surface 154, 254, or 354 of the rotary ring 150, 250, or 350. In addition, the present invention is not limited thereto, and the fluid passing hole may be horizontally formed through a vertical surface such as the vertical wall 146 or 246.

Referring to the left view in FIG. 20, the fluid passing hole 157 may increase a length in which the magnetic particles 11 in the magneto-rheological fluid 10 may form the vertical chain (G1→G2). That is, a length of the chain of the magnetic particles 11 is further increased as much as a thickness of the fluid passing hole 157 from a thickness of an original gap G (G1), such that the length of the chain may be a length corresponding to the gap G2. Therefore, the amount of change in $T_c$ value increases when the same load is applied, which makes it possible to increase overall torque.

According to the embodiment, when a diameter of the yoke part 140, 240, 340, or 440 or the rotary ring 150, 250, 350, or 450 is about 10 mm, a diameter of the fluid passing hole 147, 157, 247, 257, or 357a may be about 0.3 mm. In addition, the fluid passing hole 147, 157, 247, 257, or 357a may provide an effect of more uniformly injecting the magneto-rheological fluid 10 during the process of assembling the magneto-rheological rotating load device 100, 200, 300, or 400.

Referring to the right view in FIG. 20, the fluid passing hole 157' may be formed to be inclined at an angle (a) without being necessarily formed vertically (a=90°). Because the fluid passing hole 157' is formed to be inclined, the chain of the magnetic particles 11 may be increased by the further expanded surface area of the fluid passing hole 157'. That is, because the gap G2, which is made by increasing the original gap G (G1) as much as the thickness of the fluid passing hole 157', is formed, the chain of the magnetic particles 11 may be further formed in the gap G3 extending from an inclined surface of the fluid passing hole 157' to the rotation surface 154 of the rotary rings 150 or the surface 144 of the yoke part 140. In particular, the inclination direction may be defined in a rotation direction R of the rotary rings 150.

The inclination angle (a) may be set in consideration of the diameter of the fluid passing hole 157', the number of fluid passing holes 157', and the intensity of the rotational torque. However, the inclination angle (a) may be set to an inclination angle (a) of 30° to 80°. If the inclination angle is smaller than 30°, the fluid passing hole 157' formed through the horizontal plane has an excessively large size, which makes it difficult to implement a natural effect of the fluid passing hole. If the inclination angle is larger than 80°, there may be almost no difference in effect between the fluid passing hole 157' and the vertical fluid passing hole 157.

From another standpoint, the fluid passing hole 157 or 157' may provide a space in which the chain of the magnetic particles 11 having various sizes, lengths, and directions such as the gap G, G1, G2, or G3 is formed.

Referring to FIG. 21, it can be seen that torque increases in case that the fluid passing hole 147, 157, 247, 257, or 357a is formed when a load with 10 Hz to 100 Hz is applied. It can be seen that torque further increases when the fluid passing hole 147, 157, 247, 257, or 357a is formed even in the no-load state in which no magnetic field is applied. This seems to be a result of the increase in value of viscosity torque $T_n$ or friction torque $T_f$ made by the introduction of the magneto-rheological fluid 10 into the fluid passing hole 147, 157, 247, 257, or 357a.

Figure 22:
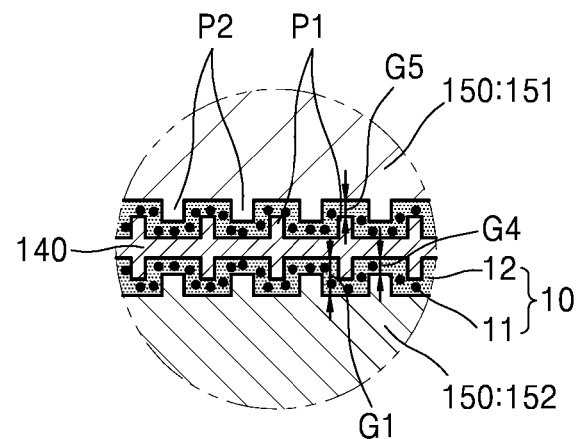
FIG. 22 is a schematic view illustrating a shape of a pattern of the yoke part and the rotary ring on a horizontal plane according to the embodiment of the present invention.

FIG. 22 is a schematic view illustrating a shape of a pattern of the yoke part 140 and the rotary rings 150 on a horizontal plane according to the embodiment of the present invention. FIG. 22 is a schematic cross-sectional side view illustrating the yoke part 140 and the rotary rings 150.

Referring to FIG. 22, a protrusion pattern P1 may be formed on the surface 144 of the yoke part 140, or a protrusion pattern P2 may be formed on the rotation surface 154 of the rotary rings 150. The protrusion patterns P1 and P2 may increase the surface area between the yoke part 140 and the rotary rings 150 so that more magnetic chains may be formed. Therefore, the rotational torque may increase when the size of the magneto-rheological rotating load device 100 remains the same. In addition to the protrusion patterns P1 and P2, roughening of the surface 144 of the yoke part 140 and the surface of the rotation surface 154 of the rotary ring 150 may increase surface roughness, such that the surface area increases, and more magnetic chains may be formed. In addition, the gaps G1, G2, and G3 having various heights may be formed by increasing surface roughness by roughening the surface 144 of the yoke part 140 and the surface of the rotation surface 154 of the rotary ring 150.

The protrusion patterns P1 and P2 may be formed on only any one of or all the yoke part 140 and the rotary rings 150. In addition, the protrusion patterns P1 and P2 may be formed to face each other or formed in a staggered manner.

Figure 23:
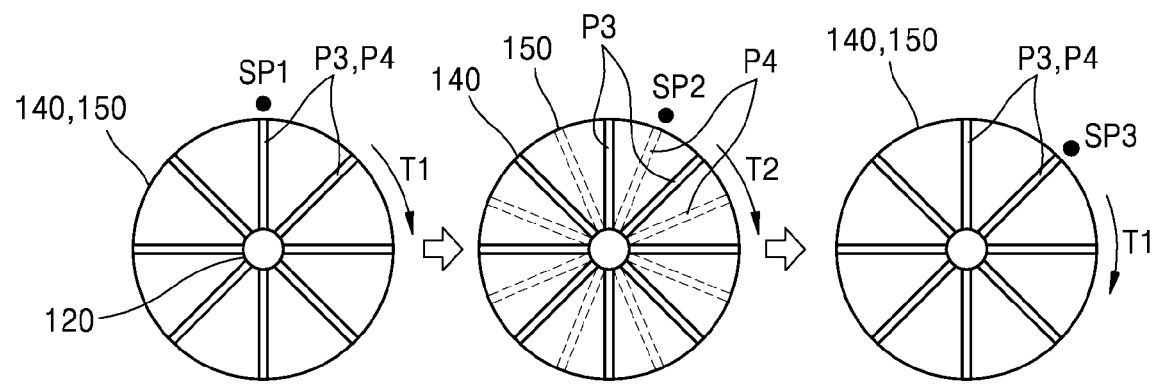
FIG. 23 is a schematic view illustrating a shape of a pattern of the yoke part and the rotary ring on the horizontal plane and a rotation process according to the embodiment of the present invention.

FIG. 23 is a schematic view illustrating a shape of a pattern of the yoke part 140 and the rotary ring 150 on the horizontal plane and a rotation process according to the embodiment of the present invention. FIG. 23 is a schematic top plan view illustrating the yoke part 140 and the rotary ring 150.

Referring to FIG. 23, protrusion patterns P3 and P4 may be formed for respective regions on the surfaces 144 and 154 of the yoke part 140 and the rotary ring 150. Forming regions, forming intervals, angles, and the like of the protrusion patterns P3 and P4 may be freely changed.

For example, the protrusion patterns P3 and P4 may be formed on the yoke part 140 and the rotary ring 150 so as to face each other. A total of eight protrusion patterns P3 and P4 may be radially formed at an angle of 45°. Referring to the first view, the user may rotate the shaft 120 clockwise based on point SP1. In this case, because the protrusion patterns P3 and P4 face each other and the magnetic chain is formed in a short gap (corresponding to a distance between the protrusion patterns), relatively high torque T1 may be applied. Next, referring to the second view, in case that the rotation is made based on point SP2, the magnetic chain is formed in a relatively long gap (corresponding to a distance between the yoke part and the surface of the rotary ring) in a region in which the protrusion patterns P3 and P4 do not face each other. Therefore, relatively low torque T2 may be applied. Because the torque, which decreases from T1 to T2, is applied, the user may receive the tactility with a loosened rotation. Next, referring to the third view, when the rotation reaches point SP3, the protrusion patterns P3 and P4 face each other again, and the magnetic chain is formed in a short gap (corresponding to the distance between the protrusion patterns), such that relatively high torque T1 may be applied. Because the torque, which increases from T2 to T1, is applied, the user may receive the tactility with a tightened rotation. As described above, the user may receive the tactility, in which the torque varies depending on the region, while rotating the shaft 120.

Figure 24:
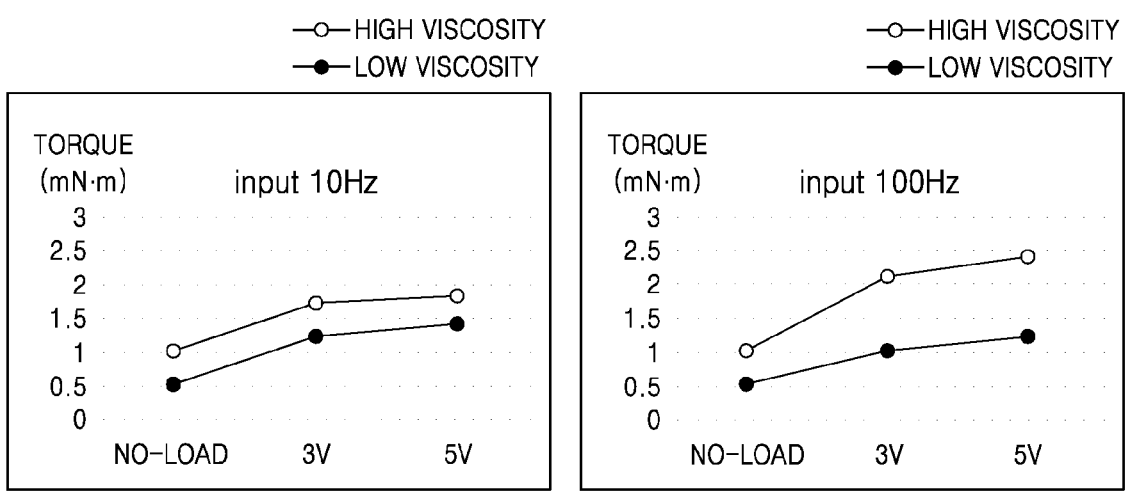
FIG. 24 is a graph illustrating torque values in accordance with viscosity of the magneto-rheological fluid according to one experimental example of the present invention.

FIG. 24 is a graph illustrating torque values in accordance with viscosity of the magneto-rheological fluid according to one experimental example of the present invention. For example, low viscosity was set to about 0.15 Pa s, high viscosity was set to about 0.4 Pa s, and density was set to about 2.8 g/ml and 3.8 g/ml. Whether the viscosity is high or low may correspond to a magnetic particle content. The high viscosity may be set when the magnetic particle content increases, and the low viscosity may be set when the magnetic particle content decreases.

Referring to FIG. 24, it can be seen that torque further increases in case that the magneto-rheological fluid 10 has high viscosity when a load with 10 Hz to 100 Hz is applied. Therefore, the magneto-rheological fluid 10 with high viscosity may implement the torque value that is hardly implemented even though a high load voltage of 10 V or more is applied under a low-viscosity condition. From another standpoint, it is possible to implement a large torque value by increasing the magnetic particle content.

For example, it is difficult to implement torque higher than 1.5 mN·m from the low viscosity based on 5 V, but the high viscosity may allow torque higher than 2 mN·m to be implemented. In particular, this configuration may be applied to prevent a rotation of a rotating load device in a particular situation (a dangerous situation, a driving situation, or the like) by maximally increasing an implemented torque value when a load of 12 V is used in a vehicle. As described above, the viscosity of the magneto-rheological fluid 10 may be set to increase maximum torque to be applied to the magneto-rheological rotating load device 100, thereby applying a safety lock function of preventing the user from manipulating the rotation. Within a range that prevents the user from manipulating the rotation at a maximum torque value, the safety lock function may be implemented by not only adjusting the viscosity but also increasing the number of rotary rings and yoke parts and the areas (facing areas, surface areas, and the like) of the rotary ring and the yoke part or performing a structural change that reduces the gap G. In addition, the safety lock function may also be implemented by applying higher electric current to the coil part.

The safety lock function refers to a function of preventing the user's general rotation manipulation so that the magneto-rheological rotating load device 100 assists the user's safety. The safety lock function requires a higher torque value than the general rotation manipulation. Because the user needs to recognize the torque value sufficiently distinguished from the general rotation manipulation, the torque value, which is generated when the safety lock function is implemented, may be as large as 1.5 times or more an average value of the torque values generated by the general rotation manipulation. For example, the safety lock function may ensure safety by preventing a dangerous manipulation while driving the vehicle (e.g., an operation of shifting a jog dial gear during driving) and prevent an unexpected idling manipulation during an operation even in home appliances such as a washing machine.

Figure 25:
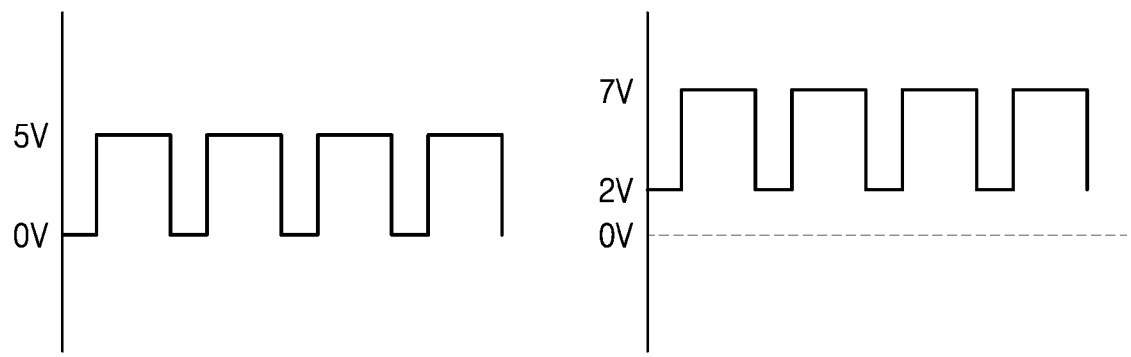
FIG. 25 is a graph illustrating basic torque values adjusted with respect to DC OFF-SET voltage according to the embodiment of the present invention.

FIG. 25 is a graph illustrating basic torque values adjusted with respect to DC OFF-SET voltage according to the embodiment of the present invention.

Referring to FIG. 25, the controller 50 may transmit a direct current offset signal to the coil part 130 on the basis of offset data corresponding to an operating mode received from the outside.

For example, in case that a basic wheel operation needs to be soft when the magneto-rheological rotating load device 100 is applied to a mouse wheel, the controller 50 may transmit the direct current offset signal to the coil part 130 so that the DC OFF-SET voltage decreases or becomes 0 V, as illustrated in the left view in FIG. 25. On the contrary, in case that the wheel needs to rotate heavily to implement a precise wheel operation, the controller 50 may transmit the direct current offset signal to the coil part 130 so that the DC OFF-SET voltage increases, as illustrated in the right view in FIG. 25.

As another example, when the jog dial (rotating load device) is set to a general driving mode in case that the magneto-rheological rotating load device 100 is applied to the vehicle, the controller 50 may transmit the direct current offset signal to the coil part 130 so that the DC OFF-SET voltage decreases or becomes 0 V, as illustrated in the left view in FIG. 25, thereby providing the tactility with slight vibration and low torque. On the contrary, when the jog dial is set to a sport driving mode, the controller 50 may transmit the direct current offset signal to the coil part 130 so that the DC OFF-SET voltage increases, as illustrated in the right view in FIG. 25, thereby providing the tactility with strong vibration and high torque.

In case that the jog dial is rotated to change gears in the vehicle, the DC OFF-SET voltage varies depending on a parking P position, a driving D position, a neutral N position, and a reverse R position, thereby providing different intensities of vibration and magnitudes of torque. Therefore, the user may easily change the driving modes or the gears only through the tactility in a state in which the line of sight is positioned forward without the recognizing the jog dial with the naked eye.

Figure 26:
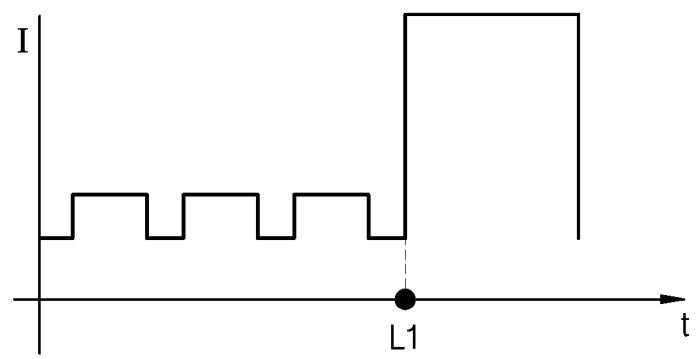
FIG. 26 is a graph illustrating stopping of a rotation of the magneto-rheological rotating load device according to the embodiment of the present invention.
Figure 27:
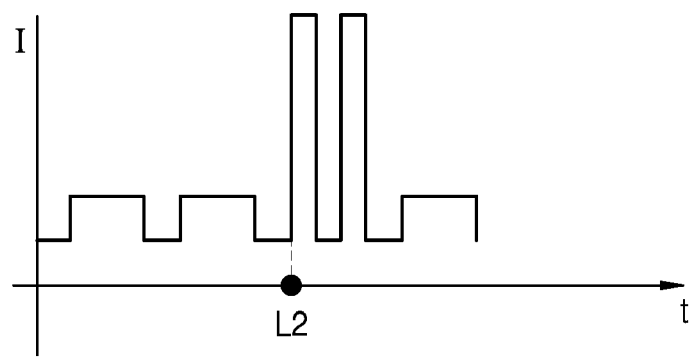
FIG. 27 is a graph illustrating recognition of a position of the magneto-rheological rotating load device according to the embodiment of the present invention.

FIG. 26 is a graph illustrating stopping of a rotation of the magneto-rheological rotating load device according to the embodiment of the present invention. FIG. 27 is a graph illustrating recognition of a position of the magneto-rheological rotating load device according to the embodiment of the present invention.

Referring to FIG. 26, the controller 50 may transmit a position recognition signal or a rotation stopping signal to the coil part 130 in case that the controller 50 determines that the shaft 120 has reached a particular rotation position L1. The position recognition signal or the rotation stopping signal may be a signal that may allow the coil part 130 to implement a torque value having a significant magnitude so that the user may distinguish the torque value from a torque value that the user generally feels at the time of rotating the shaft 120. The position recognition signal or the rotation stopping signal may be an intermittent signal or a continuous signal that is repeated multiple times.

Referring to FIG. 27, the controller 50 may transmit a position recognition signal or a rotation stopping signal to the coil part 130 in case that the controller 50 determines that the shaft 120 has reached a particular rotation position L2. The position recognition signal or the rotation stopping signal may be similar to the position recognition signal or the rotation stopping signal in FIG. 26, but the cycle of the signal, by which the user feels a degree to which the rotation is stopped, may be very short. The position recognition signal or the rotation stopping signal in FIG. 27 may be a signal that returns to a signal for implementing a general rotational torque value of the shaft 120 after the intermittent or continuous signal. Therefore, because the user may recognize resistance only at a particular position during the rotation of the shaft 120, the user may recognize the position on the basis of feeling.

Figure 28:
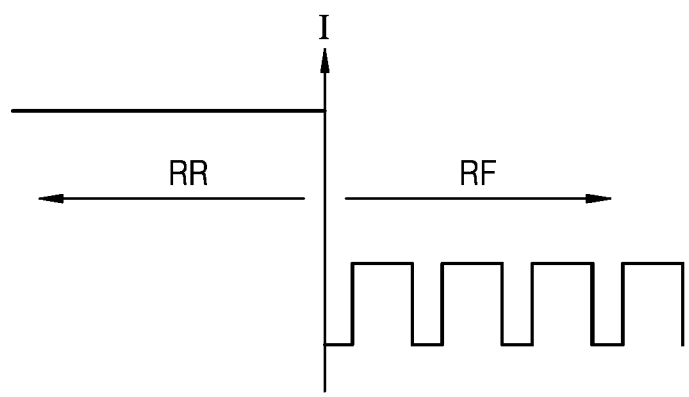
FIG. 28 is a graph illustrating stopping of a reverse rotation of the magneto-rheological rotating load device according to the embodiment of the present invention.
Figure 29:
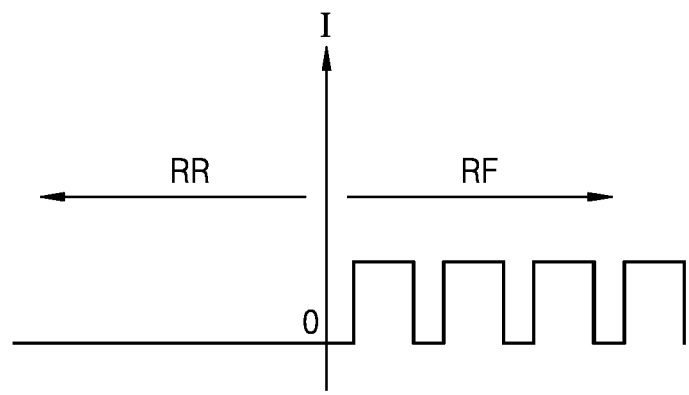
FIG. 29 is a graph illustrating a release of a reverse rotation tactility of the magneto-rheological rotating load device according to the embodiment of the present invention.

FIG. 28 is a graph illustrating stopping of a reverse rotation of the magneto-rheological rotating load device according to the embodiment of the present invention. FIG. 29 is a graph illustrating a release of a reverse rotation tactility of the magneto-rheological rotating load device according to the embodiment of the present invention.

Referring to FIG. 28, the controller 50 may transmit a rotation stopping signal to the coil part 130 in case that the controller 50 determines that the shaft 120 rotates in a reverse rotation direction RR opposite to a forward rotation direction RF. The rotation stopping signal may be a signal that may allow the coil part 130 to implement a torque value having a significant magnitude so that the user may distinguish the torque value from a torque value that the user generally feels at the time of rotating the shaft 120. The rotation stopping signal may correspond to the torque value that is generated at the time of implementing the safety lock function described above with reference to FIG. 24. The torque value, which is generated in response to the rotation stopping signal, may be as large as 1.5 times or more the average value of the torque values generated by the general rotation manipulation. The rotation stopping signal may be an intermittent signal or a continuous signal that is repeated multiple times. Therefore, the user may receive the tactility in which the shaft 120 operates only in the forward rotation direction RF and the shaft 120 is prevented from operating in the reverse rotation direction RR.

Referring to FIG. 29, the controller 50 may perform control to prevent the coil part 230 from applying the magnetic field to the magneto-rheological fluid 10 in case that the controller 50 determines that the shaft 220 rotates in the reverse rotation direction RR opposite to the forward rotation direction RF. Because the magnetic field applied by the coil part 230 is 0 when the shaft 220 rotates in the reverse rotation direction RR, the shaft 220 may rotate without being affected by resistance and torque caused by the formation of the magnetic chain. Therefore, the user may receive the tactility only when the shaft operates in the forward rotation direction RF, and the user may receive a state in which the tactility is released when the shaft operates in the reverse rotation direction RR.

Figure 30:
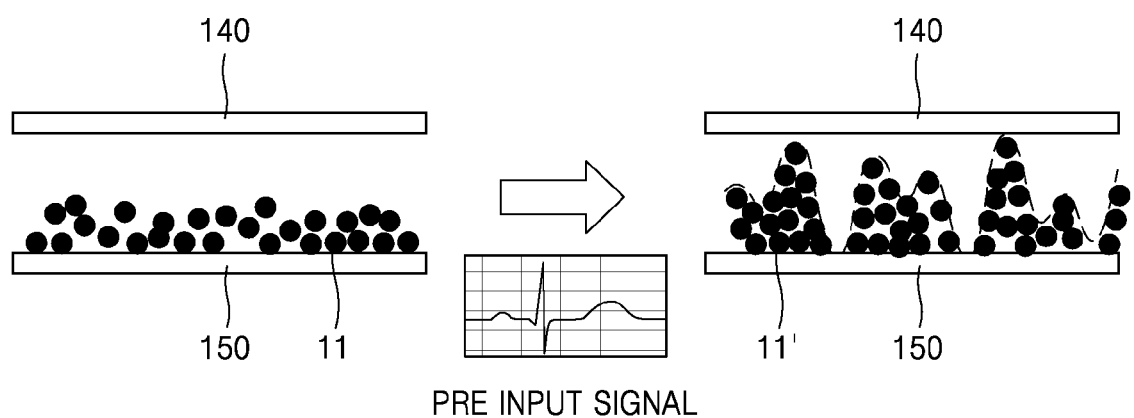
FIG. 30 is a schematic view illustrating a process of redispersing a deposited magneto-rheological fluid in response to an applied pre-input signal according to the embodiment of the present invention.
Figure 31:
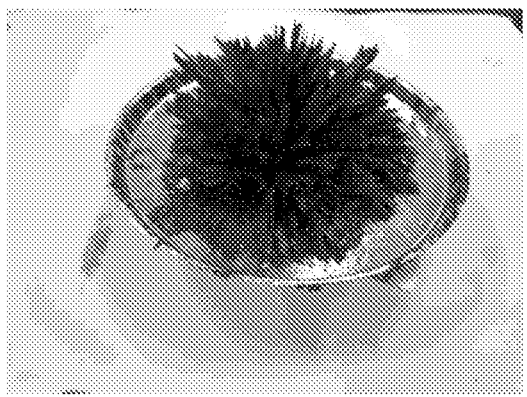
FIG. 31 is a photograph illustrating that the magneto-rheological fluid has a spike shape when the pre-input signal is applied according to the embodiment of the present invention.
Figure 31:
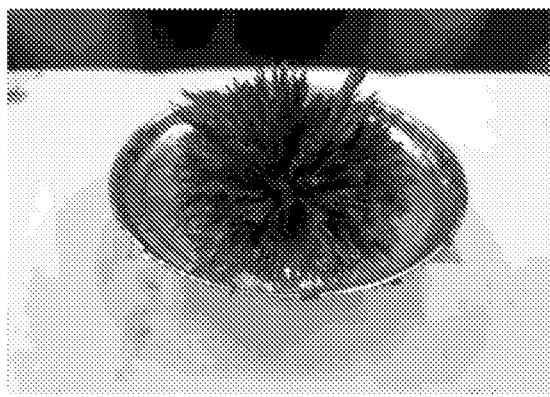
Figure 31:
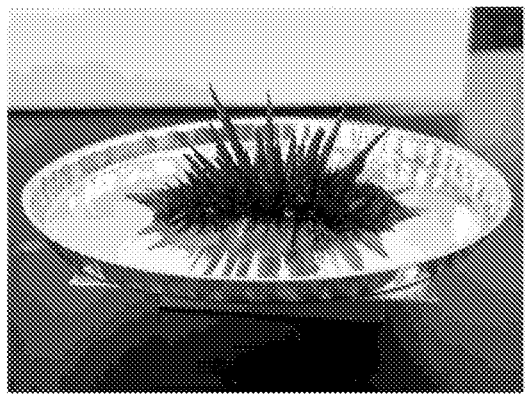

FIG. 30 is a schematic view illustrating a process of redispersing a deposited magneto-rheological fluid in response to an applied pre-input signal according to the embodiment of the present invention. FIG. 31 is a photograph illustrating that the magneto-rheological fluid has a spike shape when the pre-input signal is applied according to the embodiment of the present invention.

At the time of applying the magneto-rheological fluid 10, the deposition of the magnetic particles 11 in the fluid 12 may become a problem. Because the magnetic particles move downward over time, the magnetic chain cannot be properly formed in case that the magnetic particles are not evenly dispersed in the housings 110. Alternatively, as the magneto-rheological rotating load device 100 is consistently used, the magnetic particles 11 may be concentrated on a particular portion in the gap G between the yoke part 140 and the rotary ring 150. For example, in the device 100 of the first embodiment, the yoke part 140 and the outer peripheral portion of the rotary ring 150 are close to the solenoid coil part 130, such that many chains are formed. Further, because a distance from the solenoid coil part 130 increases toward the inside close to the axis of the shaft 120, a relatively small number of chains is formed by a weak magnetic field. In this case, because of the deposition of the magnetic particles 11, the magnetic particles 11 may be concentrated in a particular region in the gap G, and the magnetic particles 11 may be deposited and concentrated even in a lower region in the housing 110. If the magneto-rheological rotating load device 100 operates immediately in this state, the torque having a magnitude different from a preset magnitude may be generated.

Therefore, according to the present invention, the controller 50 may transmit a pre-input signal in the form of a spike, a pulse, or a sine wave to the coil part 130 before the operation of the magneto-rheological rotating load device 100 in order to smoothly redisperse the magnetic particles 11 in case that the magnetic particles 11 are deposited in the magneto-rheological rotating load device 100. The controller 50 may transmit the pre-input signal to the coil part 130 before the operation in case that the magneto-rheological rotating load device 100 does not operate for a predetermined time or more.

The pre-input signal is distinguished from the input signal that implements the magnetic chain described with reference to FIG. 5. The pre-input signal may be a signal that allows the magnetic particles in the magneto-rheological fluid 10 to move and form an incomplete or complete chain shape in at least any one direction among the vertical or horizontal directions in the gap G. The pre-input signal may be a signal that applies single or multiple high-intensity magnetic fields without a particular frequency, a waveform, or the like. In addition, the pre-input signal need not be a signal that allows the magnetic particles 11 to form the complete magnetic chain extending from a lower side of the gap G (e.g., the upper surface of the rotary rings 150) to an upper side of the gap G (e.g., the lower surface of the yoke part 140). FIG. 31 illustrates various spike shapes that are incomplete chain shapes made by magnetic particles.

When the magnetic field is applied by the coil part 130 in response to the pre-input signal, the particles 11 deposited in the magneto-rheological fluid 10 form an incomplete chain shape such as a spike shape in the direction of the magnetic field, and the application of the magnetic field may be released or only a weak magnetic field may be applied at the same time when or immediately after the incomplete chain shape is formed. Therefore, the effect of redispersing the magnetic particles 11 in the gap G may be implemented when the spike shape or the like is released, and the magnetic particles 11, which define the incomplete chain shape such as the spike shape, are spread.

Meanwhile, in case that the controller 50 determines that a height of the magnetic chain, which is formed to have a lowest height in the gap G between the yoke part 140 and the rotary rings 150 when an operating voltage $V_1$ of the magneto-rheological rotating load device 100 is applied, is lower than the height of the gap G, the controller 50 may apply a pre-input signal voltage $V_2$ that is higher than $V_1$ and used to cope with the height difference.

Figure 32:
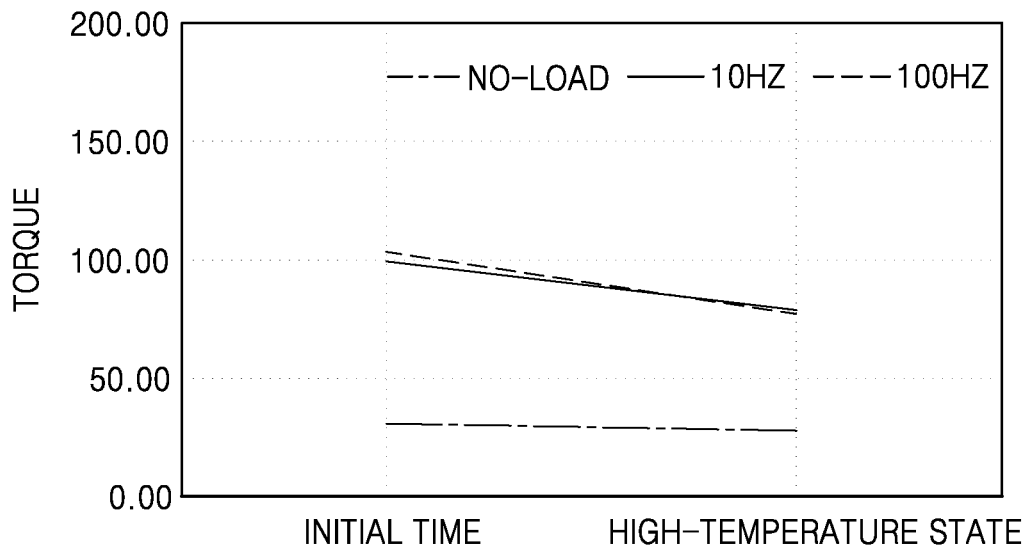
FIG. 32 is a graph illustrating torque values in accordance with temperatures of the magneto-rheological fluid according to one experimental example of the present invention.

FIG. 32 is a graph illustrating torque values in accordance with temperatures of the magneto-rheological fluid according to one experimental example of the present invention.

Referring to FIG. 32, it can be seen that the torque gradually decreases as a state (an operating state of the rotating load device) having a higher temperature than an initial state (default state) is made in accordance with changes in properties such as viscosity and shear stress of the magneto-rheological fluid based on 5 V. Therefore, the controller 50 detects an operating temperature of the magneto-rheological rotating load device. In case that the temperature becomes higher than the initial operating temperature, the controller 50 may control the intensity, the pattern, and the like of the magnetic field to offset a decrement of the torque made by the increase in temperature, thereby allowing torque intensity in the initial operating temperature to be maintained even in a high-temperature state. Therefore, it is possible to ensure uniformity of the torque value regardless of an outside temperature environment such as the summer, the winter, and the like.

Figure 33:
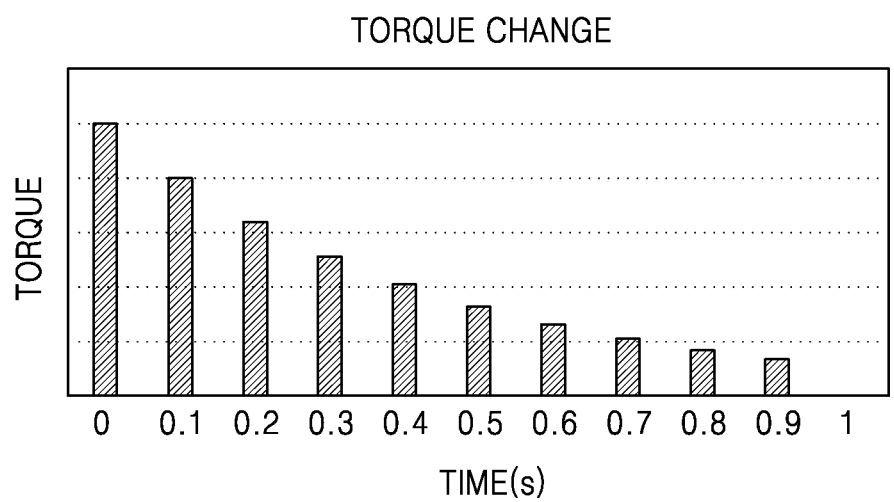
FIG. 33 is a graph illustrating torque values when the embodiment of the present invention is applied to an anti-lock brake system (ABS).

FIG. 33 is a graph illustrating torque values when the embodiment of the present invention is applied to an anti-lock brake system (ABS).

As described above, the magneto-rheological rotating load device of the present invention may increase the torque by stacking the multiple yoke parts 140 and the multiple rotary rings 150 or increasing the surface area or increase the torque by stacking the multiple yoke rings 141 and 142 and the multiple rotary rings 150 or increasing the surface area. Therefore, the magneto-rheological rotating load device may be applied to an object that requires high torque. The object may be transportation means such as vehicles, and the magneto-rheological rotating load device may be a braking device such as a brake.

In particular, in the present invention, various torque values may be implemented only by the change in intensity and pattern of the magnetic field applied by the coil part without adopting complicated structures and several components and performing control to instantaneously change various torque values, unlike the mechanical braking device in the related art. Therefore, the magneto-rheological rotating load device of the present invention may be applied to the anti-lock brake system (ABS) to implement the change in torque as illustrated in FIG. 33.

When a tire is instantaneously locked when the vehicle is suddenly braked, the vehicle may lose a braking force and slip on the ground surface by the inertial force (driving speed). A maximum static frictional force may be generated at the moment when the vehicle is slipping, and a relatively low kinetic frictional force may be generated after the vehicle is slipping. The ABS system may maximize the frictional force by continuously creating points in time at which the static frictional force changes to the kinetic frictional force by repeatedly generating a short period of time for which the maximum static frictional force operates.

The ABS system in the related art further requires a pump configured to control hydraulic pressure of a brake and pressure reduction, and an ABS modulator including an accumulator or the like and has a limitation in increasing a speed of the pattern in which the static frictional force operates. In contrast, the magneto-rheological rotating load device of the present invention may implement the ABS system by using the simple configuration that controls intensity and cycles of the applied magnetic field.

According to the embodiment, a wheel slip rate may be maintained at a level of 20% in order to solve a problem in that vehicle steering cannot be performed by wheel lock of the vehicle when the vehicle is suddenly braked. The slip rate (%) may be calculated on the basis of {V (vehicle speed)−V (wheel speed)}/V (wheel speed).

The braking device to which the present invention is applied may solve a problem with durability caused by repeated control of a hydraulic brake, accurately control the brake, and prevent a frequent breakdown of the ABS modulator.

Figure 34:
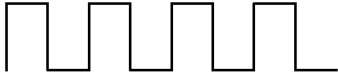
FIG. 34 is a graph illustrating signals applied to a coil part and torque related to the signals according to the embodiment of the present invention.

FIG. 34 is a graph illustrating signals applied to a coil part and torque related to the signals according to the embodiment of the present invention.

The controller 50 may transmit a pattern signal to the coil part 130 on the basis of event pattern data corresponding to an effect of the event received from the outside or audio pattern data corresponding to the audio signal. The pattern signal may be provided in the form of a pulse, a sine, a triangle, a sawtooth, or the like. The shape, intensity, and the like of the torque generated by the magneto-rheological fluid 10 may vary while corresponding to several pattern signals applied to the coil part 130. For example, even though the pattern signal having the same pulse shape is applied to the coil part 130, a blunt tactility may be transferred as a duty cycle increases, and a sharp tactility may be transferred as the duty cycle decreases. Even in a case in which the pattern signal is provided in the form of a sine, a triangle, or a sawtooth, the blunt tactility may be transferred as the wavelength and the cycle are lengthened, and the sharp tactility may be transferred when the wavelength and the cycle are shortened.

The following multiple applications may be made by the above-mentioned process of controlling the pattern signal of the controller 50 and the control process described above with reference to FIGS. 25 to 29.

For example, when a user performs work such as document work or coding by using an electronic device, such as a PC or a tablet computer, which has a display, the controller 50 may temporarily store an editing position, a cursor position, and the like made by the user. Further, when the user returns back to the stored editing position after performing work at another position, the controller 50 may transmit a pattern signal to the coil part 130 to provide another distinguishable manipulation tactility when the cursor reaches the stored editing position. As illustrated in FIG. 26, when the cursor reaches the stored editing position, the controller may transfer the position recognition signal or the rotation stopping signal. Alternatively, the controller may transmit a pattern signal that becomes gradually intense as the cursor becomes gradually close to the stored editing position, thereby providing convenience for the user so that the user may easily find the editing position.

As another example, in case that event switching in which various programs, applications, slides, pages, and the like are changed in the display occurs, the controller 50 may provide tactilities distinguishable between the movements on the basis of event switching data corresponding to the event switching. For example, the controller may provide a tactility with high torque to a title page of a document by increasing the DC OFF-SET voltage, as illustrated in FIG. 25, and provide a tactility with low torque to a body text page by decreasing the DC OFF-SET voltage. Alternatively, a torque value of a mouse scroll may be changed in case that a game character acquires an item while playing a game, in case that a game character receives resistance such as water, sand, or mud while moving, or in case that a game character climbs a ladder or rope. Alternatively, when a predetermined time is required after a particular action occurs during the game play, an alarm tactility may be provided through the mouse scroll when the predetermined time elapses, which makes it possible to remove the inconvenience of the user having to visually check the predetermined time through the display.

As another example, in case that a precise event occurs in which mouse scroll needs to be precisely moved in a PC, the controller 50 may perform control to increase the intensity of the magnetic field applied to the magneto-rheological fluid by the coil part 130. As illustrated in FIG. 25, high torque may be provided by increasing the DC OFF-SET voltage so that the wheel is heavily rotated.

Figure 35:
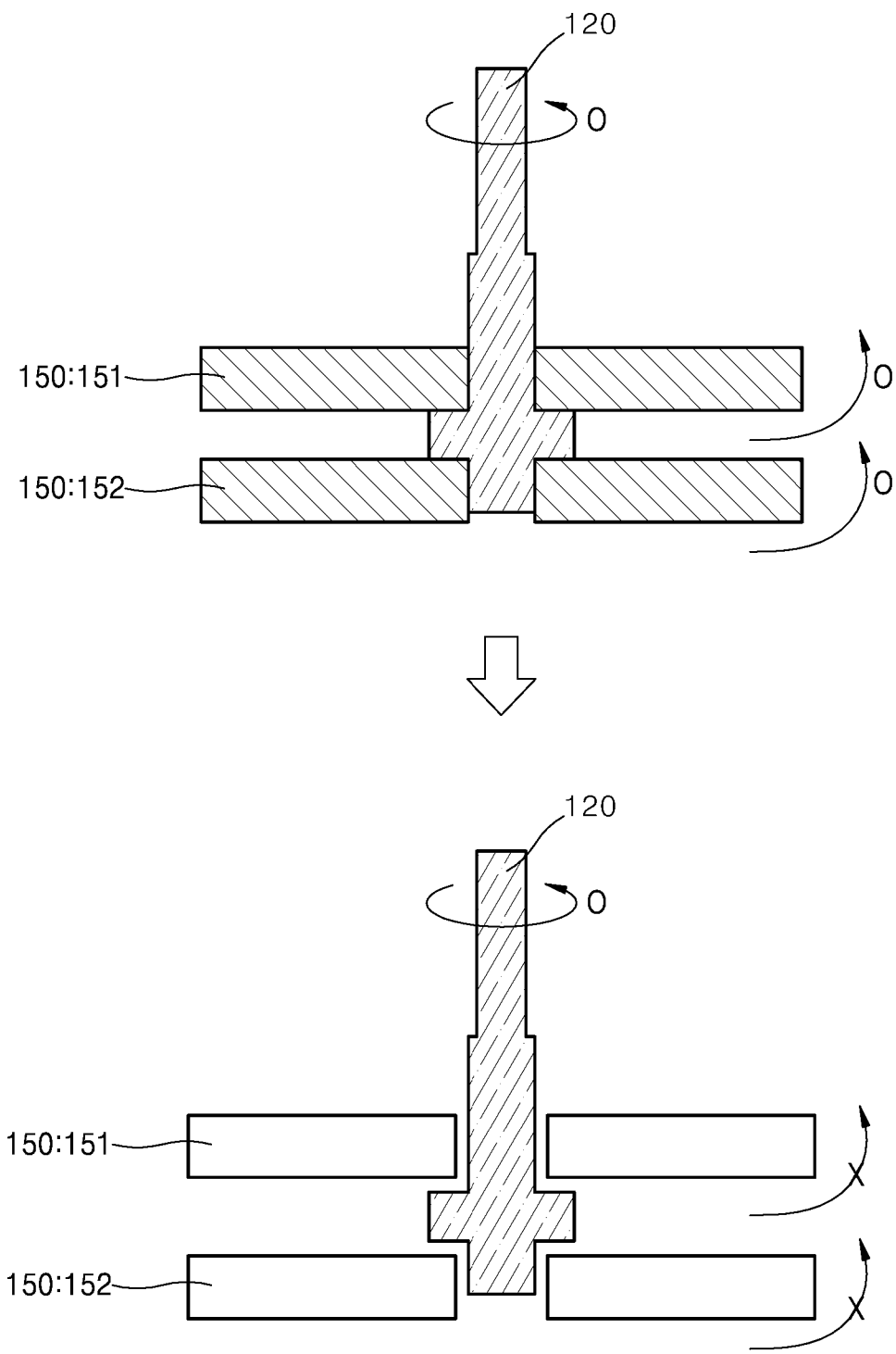
FIG. 35 is a schematic view illustrating rotation states of a shaft and the rotary ring and a rotation state of the rotary ring when the rotary ring is separated from the shaft according to the embodiment of the present invention.

FIG. 35 is a schematic view illustrating rotation states of the shaft 120 and the rotary ring 150 and a rotation state when the rotary ring 150 is separated according to the embodiment of the present invention.

Referring to the upper view in FIG. 35, the axis of the shaft 120 may be inserted and connected to the through-hole 159 of the rotary ring 150. As the shaft 120 and the rotary ring 150 are connected to each other, the rotary ring 150 rotates together with the shaft 120 when the shaft 120 rotates. Because the rotary ring 150 receives resistance caused by the chain structure of the magneto-rheological fluid during the rotation process, the rotary ring 150 may sometimes be separated from the shaft 120 in case that the magneto-rheological rotating load device 100 is used over a long period of time, or high torque is applied to the rotary rings 150.

Referring to the lower view in FIG. 35, the rotary rings 150 (151 and 152) are separated from the shaft 120 and cannot be rotated even though the user rotates the shaft 120 by applying a force to the shaft 120. In this case, because resistance caused by the chain structure of the magneto-rheological fluid is not provided to the large horizontal plane of the rotary rings 150, a desired tactility cannot be provided to the user through the shaft 120. Meanwhile, because the interior of the magneto-rheological rotating load device 100 is sealed by the housings 110, it is difficult to immediately identify the state in which the shaft 120 and the rotary rings 150 are connected. Therefore, a solution for identifying the connected state between the shaft 120 and the rotary rings 150 without disassembling the magneto-rheological rotating load device 100 is considered.

Figure 36:
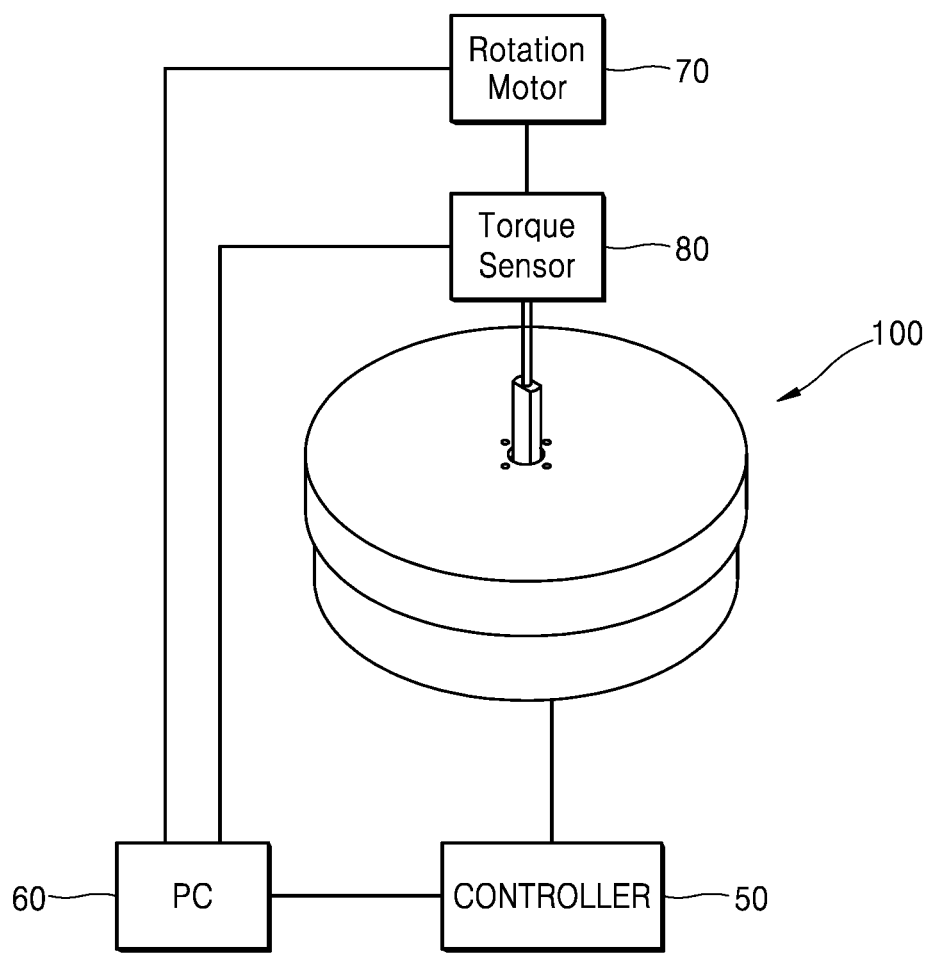
FIG. 36 is a schematic view illustrating a method of measuring a state in which the rotary ring is separated from the shaft according to the embodiment of the present invention.
Figure 37:
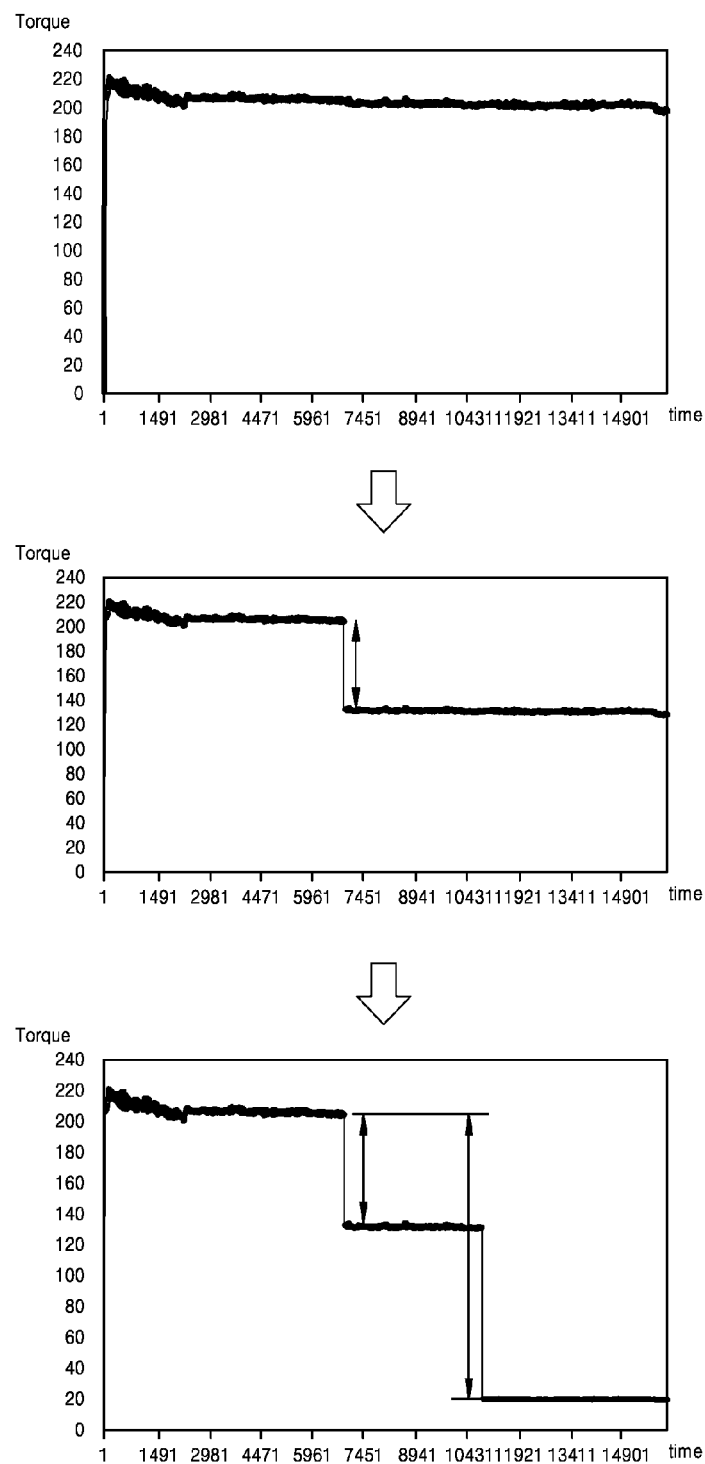
FIG. 37 is a graph illustrating torque values when the rotary ring is separated from the shaft according to the embodiment of the present invention.

FIG. 36 is a schematic view illustrating a method of measuring a state in which the rotary ring 150 is separated from the shaft 120 according to the embodiment of the present invention. FIG. 37 is a graph illustrating torque values when the rotary ring 150 is separated from the shaft 120 according to the embodiment of the present invention.

Referring to FIG. 36, the magneto-rheological rotating load device 100, a PC 60, a rotary motor 70, and a torque sensor 80 are prepared. The PC 60 may control the magneto-rheological rotating load device 100 and the rotary motor 70 and collect values measured by the torque sensor 80. The rotary motor 70 may be connected to a portion of the shaft 120 of the magneto-rheological rotating load device 100 and transmit a rotational force of the motor to the shaft 120. The torque sensor 80 may measure the torque value that the shaft 120 receives while rotating. The controller 50 performed control to transmit a predetermined electric current to the coil part 130. The magneto-rheological rotating load device 100 having the two rotary rings 150 (151 and 152) of the first embodiment was used. A DC input signal was applied to the coil part 130 to maintain a DC torque value while having a high torque value. The input DC electric current of 1 A was continuously applied for one or more hours.

Referring to the first graph in FIG. 37, a constant torque value is implemented in accordance with the application of a constant electric current value even though the time elapses in case that the shaft 120 and the rotary rings 150 (151 and 152) are normally connected.

Referring to the second graph in FIG. 37, it can be seen that the torque value discontinuously decreases in case that one of the rotary rings 150 is separated from the shaft 120. The torque value is shown as decreasing by about 35% from an initial value.

Referring to the third graph in FIG. 37, it can be seen that the torque value discontinuously decreases again in case that the two rotary rings 150 are separated from the shaft 120. The torque value is shown as decreasing by about 90% from an initial value.

In this case, the torque value was measured on the assumption that the rotary ring 150 is separated from the shaft 120. However, the torque value may be rapidly decreased by a structural defect caused by damage to the shaft 120 and the rotary ring 150 or damage to the housings 110 and the yoke part 140 in addition to the separation of the rotary ring 150.

The assumption is made that the same electric current or voltage is transmitted to the coil part 130, such that the coil part 130 may apply the magnetic field with predetermined intensity to the magneto-rheological fluid 10. In this case, when the measurement result indicates that the torque value decreases by about 30% or more from the initial torque value of the magneto-rheological fluid 10, it may be determined that a structural defect has occurred on the magneto-rheological rotating load device 100. The initial torque value may be stored in advance in the controller 50 and used as a criterion for comparing the torque values.

A torque sensor may be further installed to check a structural defect during the use of the magneto-rheological rotating load device 100. Alternatively, the torque sensor may be added to an encoder sensor 500 to be described below with reference to FIG. 38. The controller 50 may determine whether a structural defect occurs by receiving the torque value in real time and comparing the torque value with the initial torque value. When the controller 50 determines that the structural defect has occurred, the controller 50 may provide a structural defect notification to a display, a PC, and the like connected to the magneto-rheological rotating load device 100. Alternatively, the magneto-rheological rotating load device 100 may further include a structural defect display part (not illustrated) such as an LED, and the controller 50 displays a structural defect notification signal on the structural defect display part, such that the user may immediately identify the structural defect.

Meanwhile, on the assumption that the number of rotary rings 150 is N, which is three or more, and the electric current or voltage applied to the magneto-rheological fluid 10 remains the same, it may be determined that a structural defect has occurred on the magneto-rheological rotating load device 100 when the measurement result indicates that the torque value decreases by about (100/N) % or more from the initial torque value. For example, in case that five rotary rings are used, one ring is separated, and only the four rings are kept connected to the shaft, it may be determined that a structural defect has occurred when the measurement result indicates that torque value decreases by about 20% or more.

Figure 38:
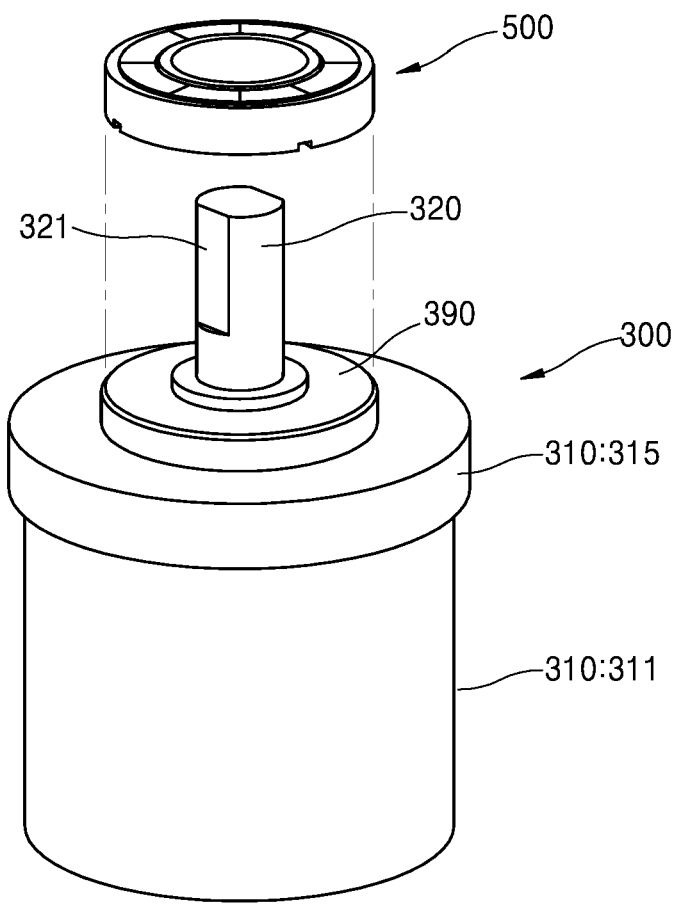
FIG. 38 is a schematic view illustrating a magneto-rheological rotating load module according to the embodiment of the present invention.

FIG. 38 is a schematic view illustrating a magneto-rheological rotating load module according to the embodiment of the present invention.

Rotating load modules may be implemented by coupling various units to the magneto-rheological rotating load device 100, 200, 300, or 400. According to the embodiment, the magneto-rheological rotating load module may be made by coupling the encoder sensor 500 to the magneto-rheological rotating load device 300. Typically, the bearing part 390 and the shaft 320 are coupled to reduce a rotational frictional force. However, the encoder sensor 500, which is made by coupling the bearing part 390 to an encoder configured to detect data related to a rotational speed, a position, and a direction, may be coupled to the magneto-rheological rotating load device 300.

FIGS. 39 to 44 are views illustrating states in which the magneto-rheological rotating load devices according to the several embodiments of the present invention are applied.

Both the magneto-rheological rotating load device and the rotating load module may be applied to all the devices having the dials or the wheels.

Figure 39:
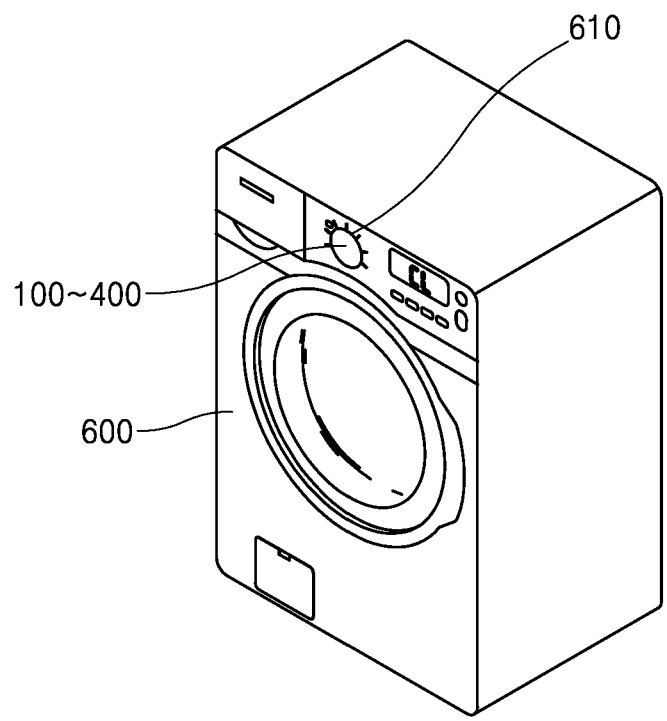
FIGS. 39 to 44 are views illustrating states in which the magneto-rheological rotating load devices according to the several embodiments of the present invention are applied.

Referring to FIG. 39, the magneto-rheological rotating load device 100, 200, 300, or 400 may be applied to a user interface (UI) 610 of a washing machine 600, a microwave oven, or the like, and the dial (the shaft 120, 220, 320, or 420) may be positioned at positions corresponding to various types of operation modes, thereby providing various tactilities in accordance with the operation modes. For example, in the washing machine, a soft rotation tactility may be provided when a general washing mode is set, and a rotation tactility with high torque may be provided when a strong washing mode is set.

Figure 40:
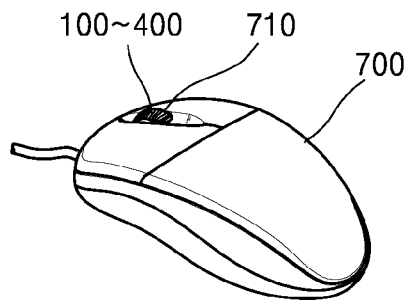
Figure 40:
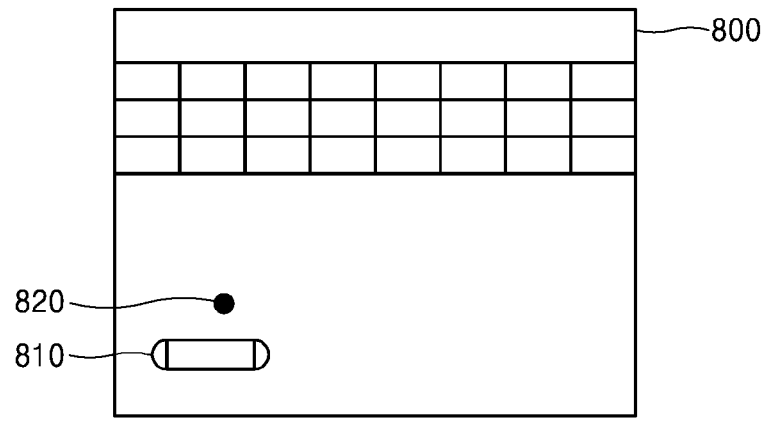

Referring to FIG. 40, the magneto-rheological rotating load device 100, 200, 300, or 400 may be applied to a wheel 710 of a mouse 700, such that various haptic tactilities may be provided as the torque for manipulating the wheel 710 varies depending on use environments. For example, in case that an emergency situation occurs during the game, the torque for operating the wheel 710 may increase. In addition, as illustrated in the lower view in FIG. 40, when the user plays a block break game 800 while moving the mouse wheel 710 leftward and rightward, the user may move a reflector 810 leftward and rightward by manipulating the wheel 710 in the upward/downward direction. In this case, when the user operates the wheel in the upward direction, the reflector is moved to a left edge, such that there is no space in which the reflector may move. In this case, the torque for operating the mouse wheel 710 in the upward direction increases, such that any further manipulation cannot be performed, and the mouse wheel 710 may be allowed to operate only in the downward direction. In addition, the rigidity of the wheel 710 is instantaneously changed at the moment when a ball 820 is reflected by the reflector 810, such that the state in which the ball 820 is reflected may be immediately provided to the user as the tactility.

Figure 41:
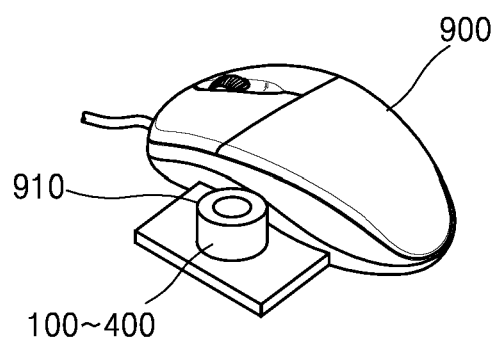

Referring to FIG. 41, a mouse 900 may separately include a dial 910 in addition to a button or a wheel. The magneto-rheological rotating load device 100, 200, 300, or 400 may be applied to the dial 910 to set various types of operation modes of the mouse 900. Alternatively, the dial 910 may be used as an input means in conjunction with the button and the wheel of the mouse 900, and a haptic tactility may be provided by a change in rotational torque during an input process.

Figure 42:
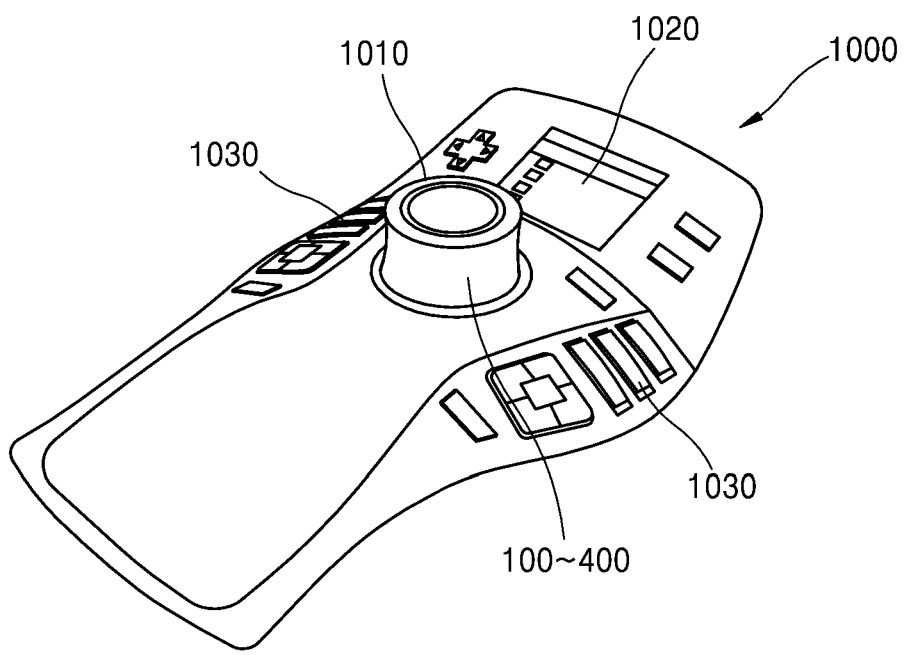

Referring to FIG. 42, a vehicle controller 1000 may include a dial-type gear shift part 1010 or an operation mode selection part 1010. The vehicle controller 1000 may further include a display 1020 to display a driving state of the vehicle. The vehicle controller 1000 may further include a button part 1030 and set an auxiliary driving option. The magneto-rheological rotating load device 100, 200, 300, or 400 may be applied to the dial-type gear shift part 1010 or the operation mode selection part 1010 to change various types of operation modes of the vehicle. For example, a change in torque may be provided as a tactility when gear shifting is applied as the dial-type gear shift part 1010 changes a gear position to a P (parking), D (driving), N (neutral), or R (reverse) position. In particular, when the dial-type gear shift part 1010 is intended to be rotated suddenly to the P (parking) or R (reverse) position at the time of driving (D) the vehicle, a rotational torque value may be controlled to be rapidly increased, such that a safety lock function may be implemented. As another example, the operation mode selection part 1010 may change the rotational torque values depending on whether the operation mode is a comfort or sport mode.

Figure 43:
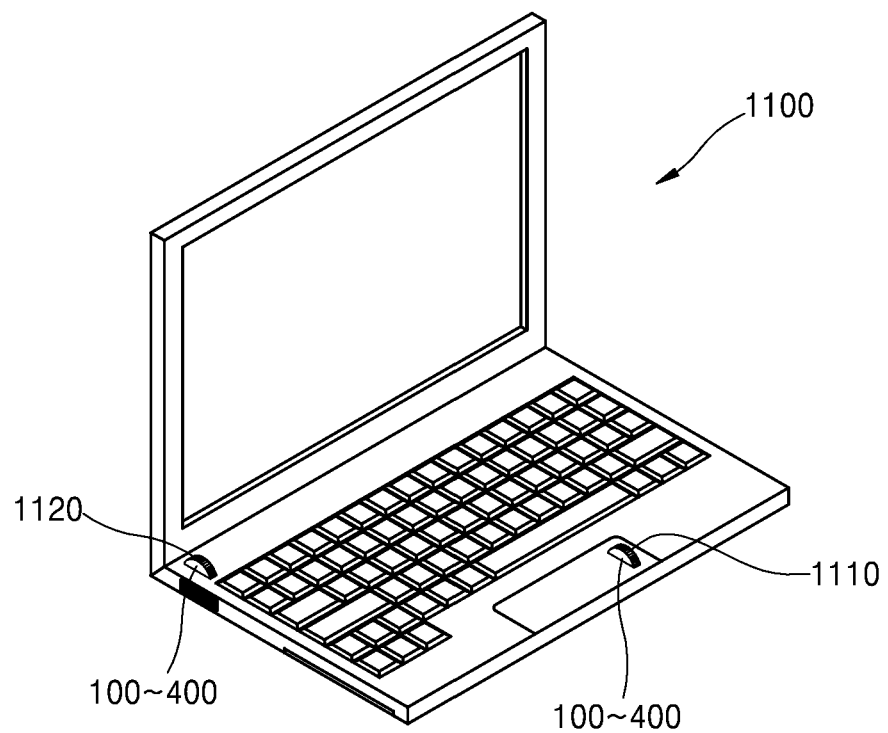

Referring to FIG. 43, a notebook 1100 or computer may further include a functional part 1110 such as a wheel provided on a touch pad positioned below a keyboard. Alternatively, the keyboard may further include a functional part 1120 such as a separate wheel. The magneto-rheological rotating load device 100, 200, 300, or 400 may be applied to the functional part 1110 or 1120, such that various haptic tactilities may be provided as the torque for manipulating the wheel 710 varies depending on use environments.

Figure 44:
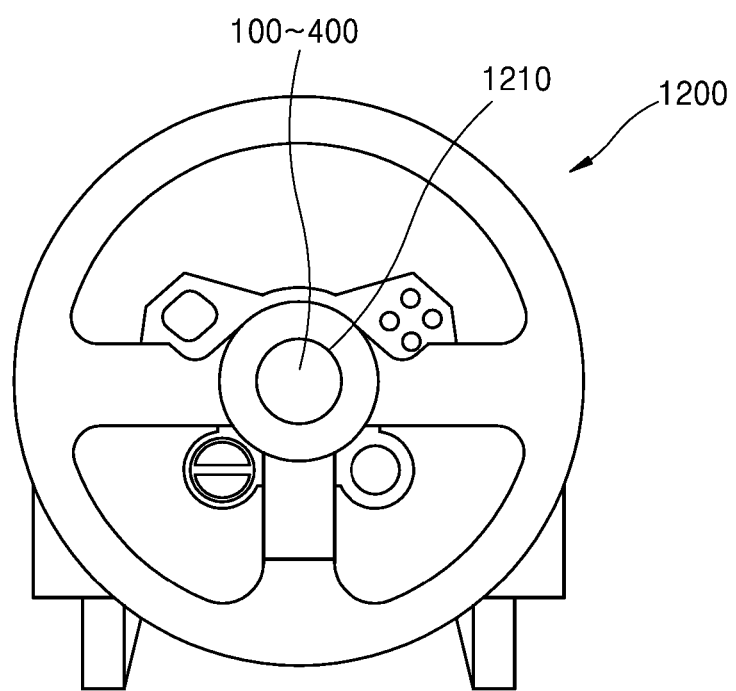

Referring to FIG. 44, the magneto-rheological rotating load device 100, 200, 300, or 400 may be applied to a racing game steering wheel 1200 or a shaft 1210 of a steering wheel 1200 for a vehicle. For example, a change in tactility caused by a change in rotational torque of the magneto-rheological rotating load device 100, 200, 300, or 400 may be provided to the racing game steering wheel 1200 so as to correspond to a road surface state during a process in which a vehicle moves in a game screen. As another example, a torque value by which the steering wheel 1200 is rotated may vary depending on whether a driving mode is a comfort mode or a sport mode in the racing game.

Meanwhile, in the multiple embodiments described above with reference to FIGS. 39 to 44, buttons for turning on or off the tactility haptic function or adjusting setting may be further provided on the mouse, the keyboard, the steering wheel, the vehicle, the household electrical appliances, and the like. Alternatively, setting windows may be provided on control screens (PC screens, smartphone screens, and the like) connected to the mouse, the keyboard, the steering wheel, the vehicle, the household electrical appliance, and the like to turn on or off the tactility haptic function or set haptic intensity, patterns, and the like.

According to the present invention described above, various patterns may be made in response to various input signals when the rotating load device rotates, thereby allowing the user to feel various high-grade tactilities. In addition, according to the present invention, the rotational torque may be changed, the production cost may be reduced, and the device may be easily miniaturized, which makes it possible to implement the applications variously applied for proper purposes by using shear properties or viscosity of the magneto-rheological fluid.

While the present invention has been illustrated and described above with reference to the exemplary embodiments, the present invention is not limited to the embodiments, and various modifications and alterations may be made by those skilled in the art without departing from the spirit of the present invention. It should be understood that the modifications and alterations belong to the appended claims of the present invention.

What is claimed is:

1. A method of evaluating a structural defect of a magneto-rheological rotating load device, wherein the magneto-rheological rotating load device comprises a housing, a shaft rotatably installed in the housing, one or more rotary rings connected to the shaft and configured to rotate in conjunction with a rotation of the shaft, a coil part disposed in the housing, a magneto-rheological fluid with which at least a part in the housing is filled, and a controller configured to control a magnetic field applied to the magneto-rheological fluid by the coil part, the method comprising:
when at least one of the one or more rotary rings is separated from the shaft, determining by the controller that the structural defect has occurred when measuring of a torque value indicates that the torque value, which is applied when the shaft rotates, decreases from an initial set value within a predetermined range, wherein the decrease of the torque value within the predetermined range is a discontinuous decrease of the torque value from the initial set value.

2. The method of claim 1, wherein the initial set value of the torque value is a value when a magnetic field with predetermined intensity is applied to the magneto-rheological fluid from the coil part.

3. The method of claim 1, wherein the controller determines that the structural defect has occurred when the measuring of the torque value indicates that the torque value decreases by 30% or more but 100% or less from the initial set value of the torque value.

4. The method of claim 1, wherein the number of rotary rings is N, wherein N is a natural number larger than three, and wherein the controller determines that the structural defect has occurred when the measuring of the torque value indicates that the torque value decreases by 100/N % or more but 100% or less from the initial set value of the torque value.

5. The method of claim 1, wherein the initial set value of the torque value is stored in advance in the controller.

6. The method of claim 1, wherein a torque sensor is connected to a shaft portion of the shaft, which is disposed outside the housing, and measures the torque value when the shaft rotates.

7. The method of claim 1, wherein the controller transmits a structural defect notification signal to an external device connected to the magneto-rheological rotating load device when the controller determines that the structural defect occurs on the magneto-rheological rotating load device.

8. The method of claim 1, wherein the magneto-rheological rotating load device further comprises a structural defect display part, and wherein the controller operates the structural defect display part when the controller determines that the structural defect occurs on the magneto-rheological rotating load device.

* * * * *